May 3, 1966 R. W. PULVER, JR 3,249,920
PROGRAM CONTROL ELEMENT
Filed June 30, 1960 17 Sheets-Sheet 1

INVENTOR
RALPH W. PULVER JR.

BY
ATTORNEY

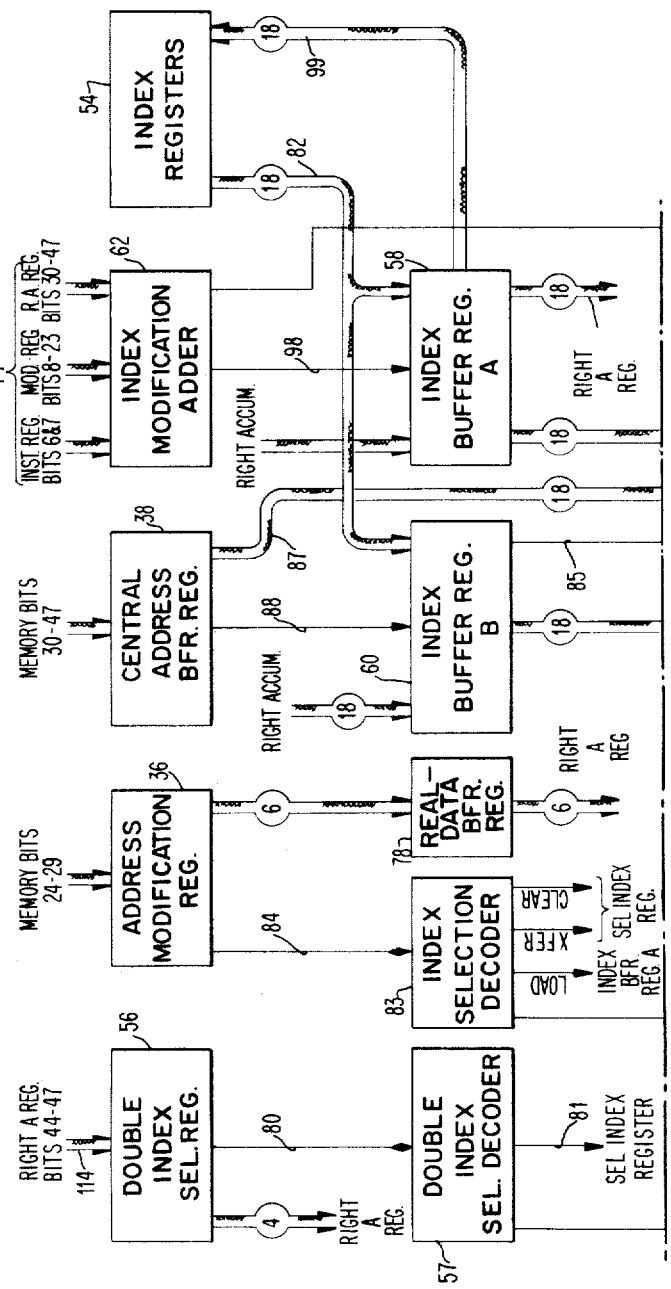

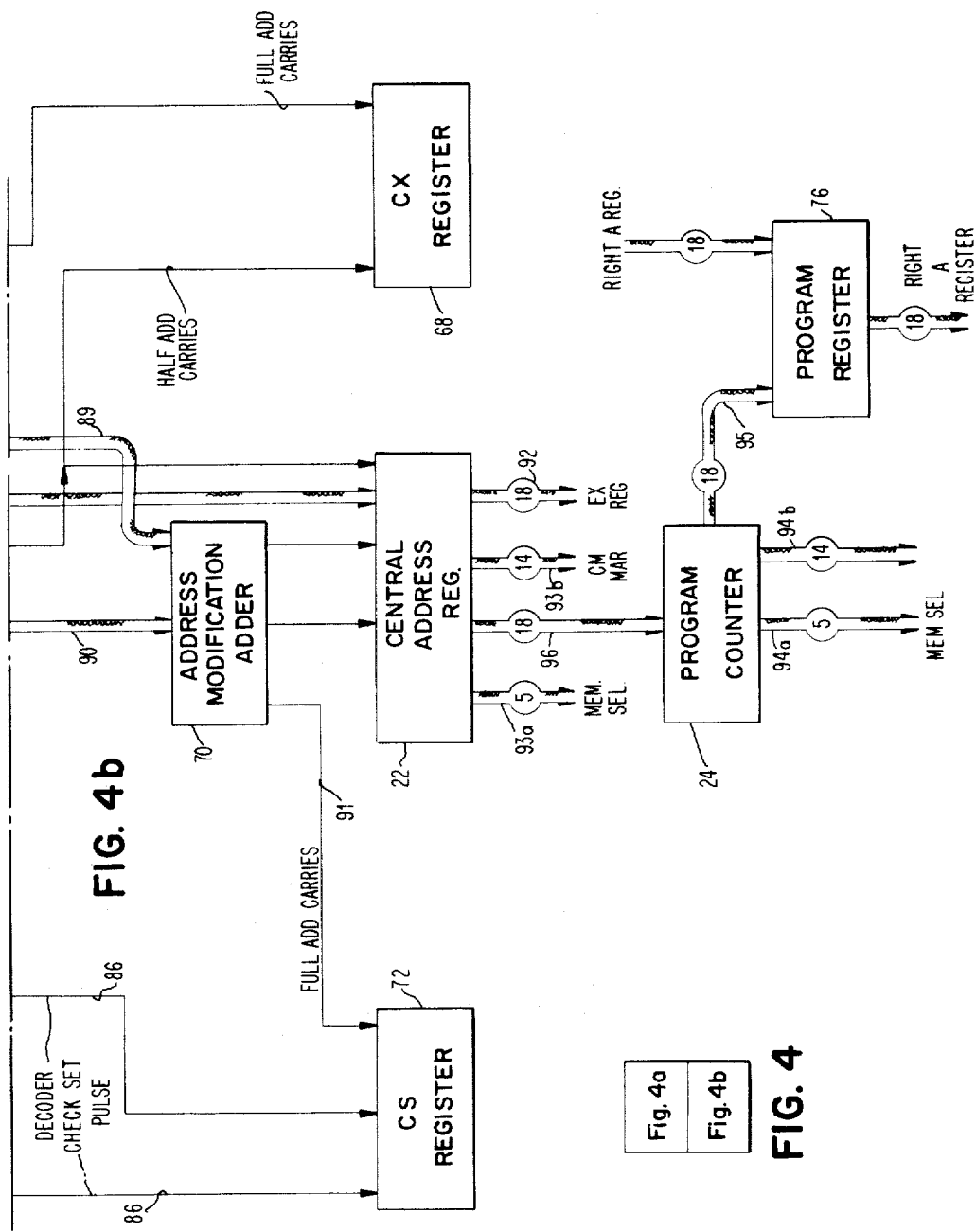

May 3, 1966 R. W. PULVER, JR 3,249,920
PROGRAM CONTROL ELEMENT
Filed June 30, 1960 17 Sheets-Sheet 4
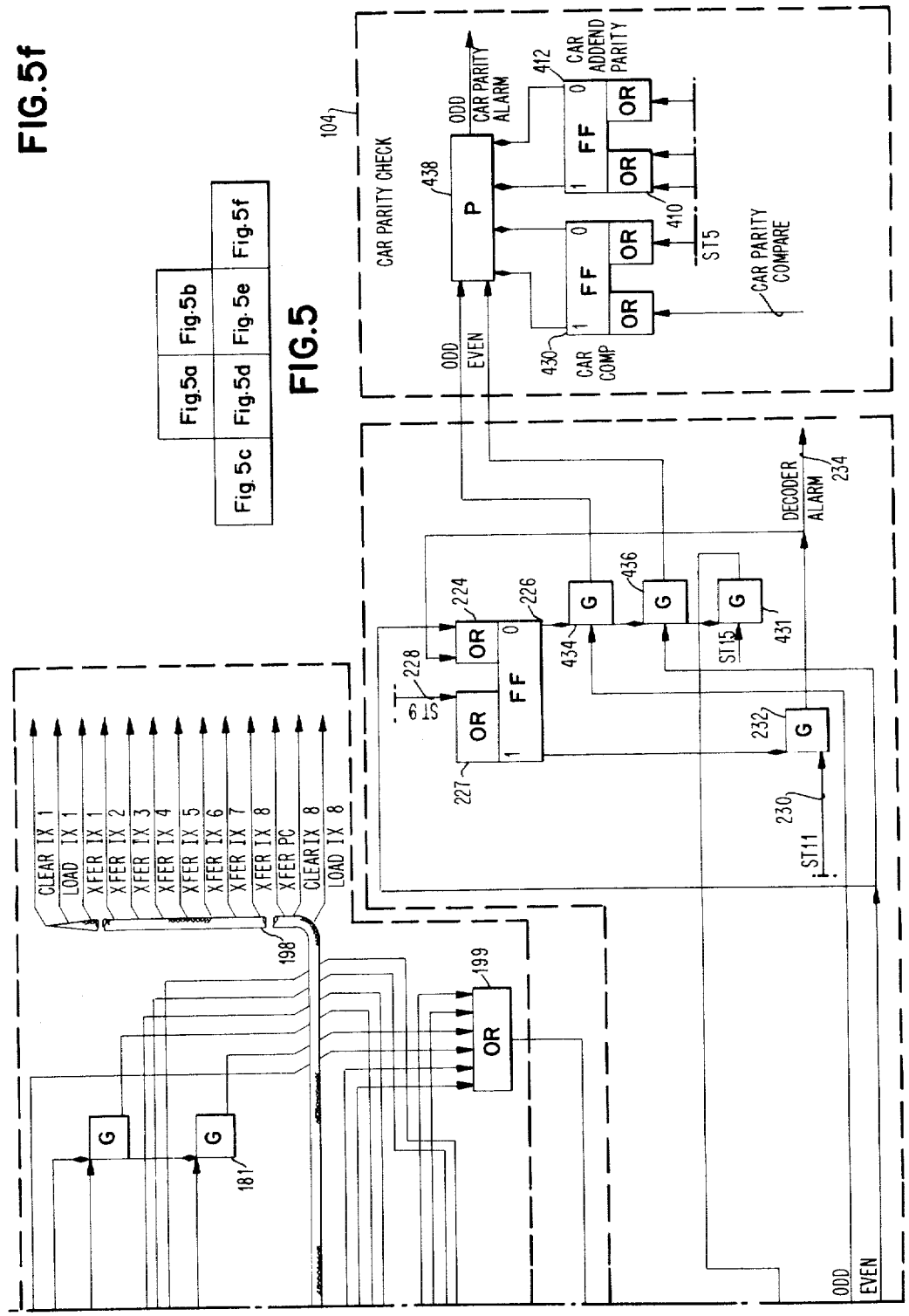

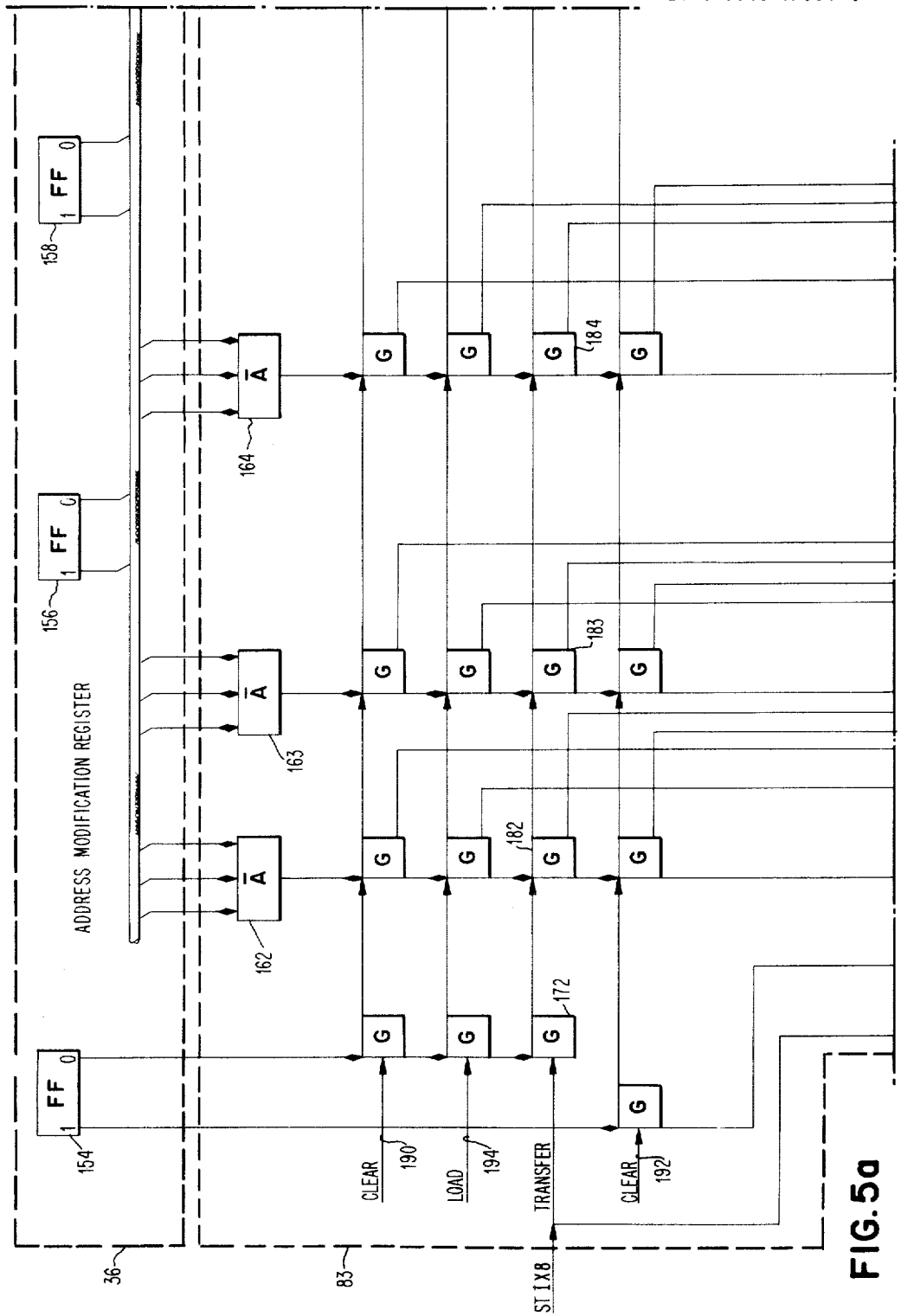

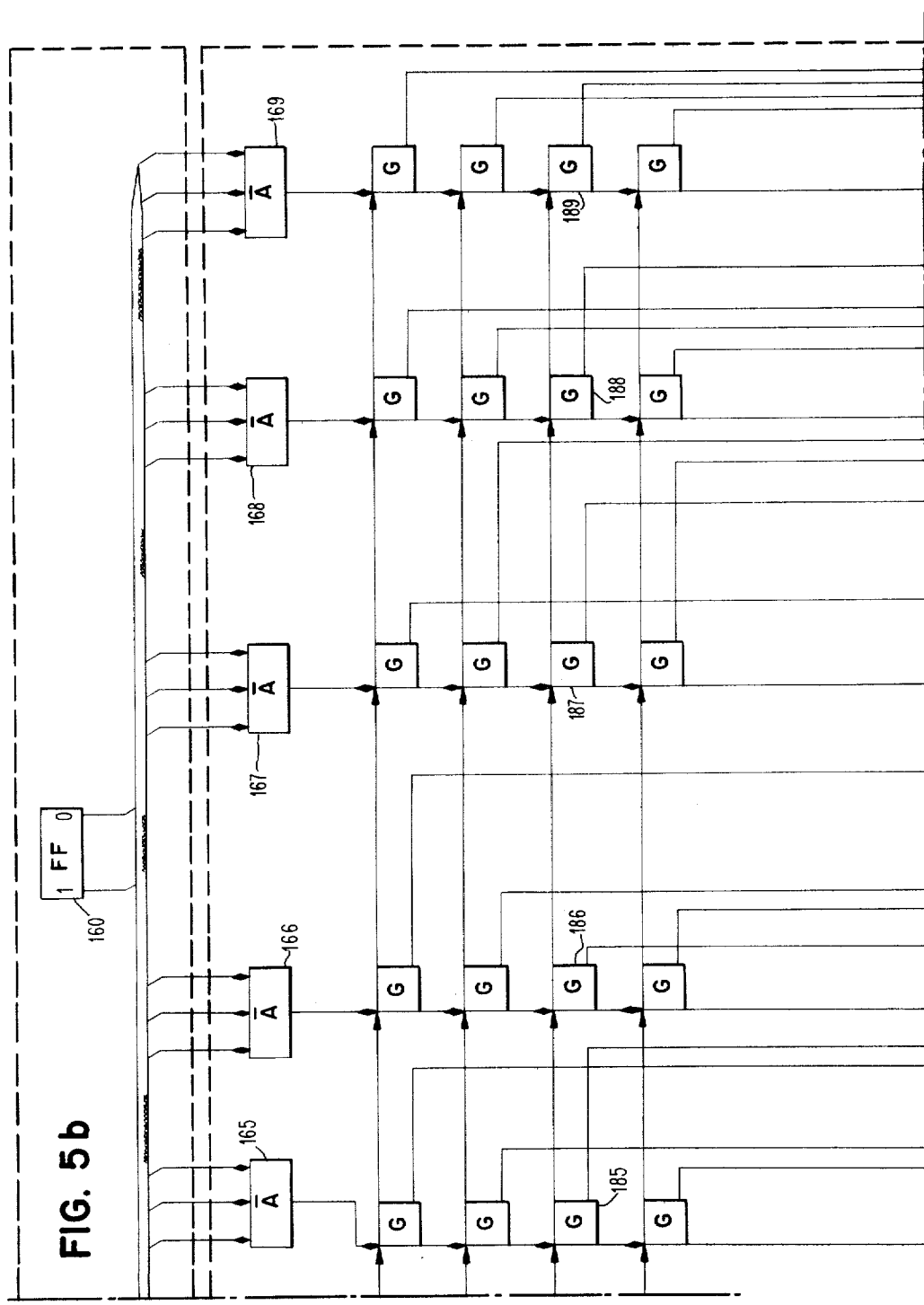

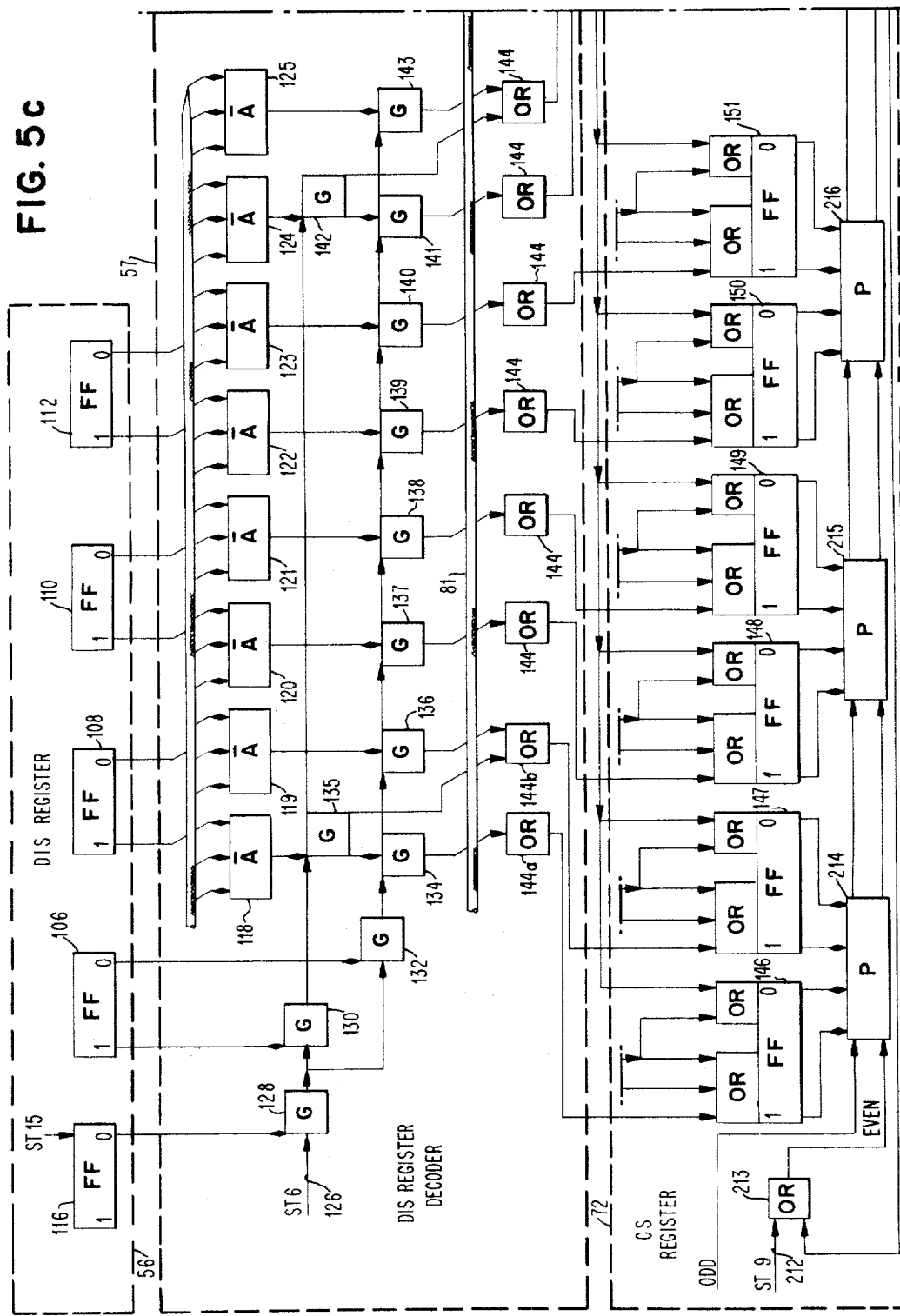

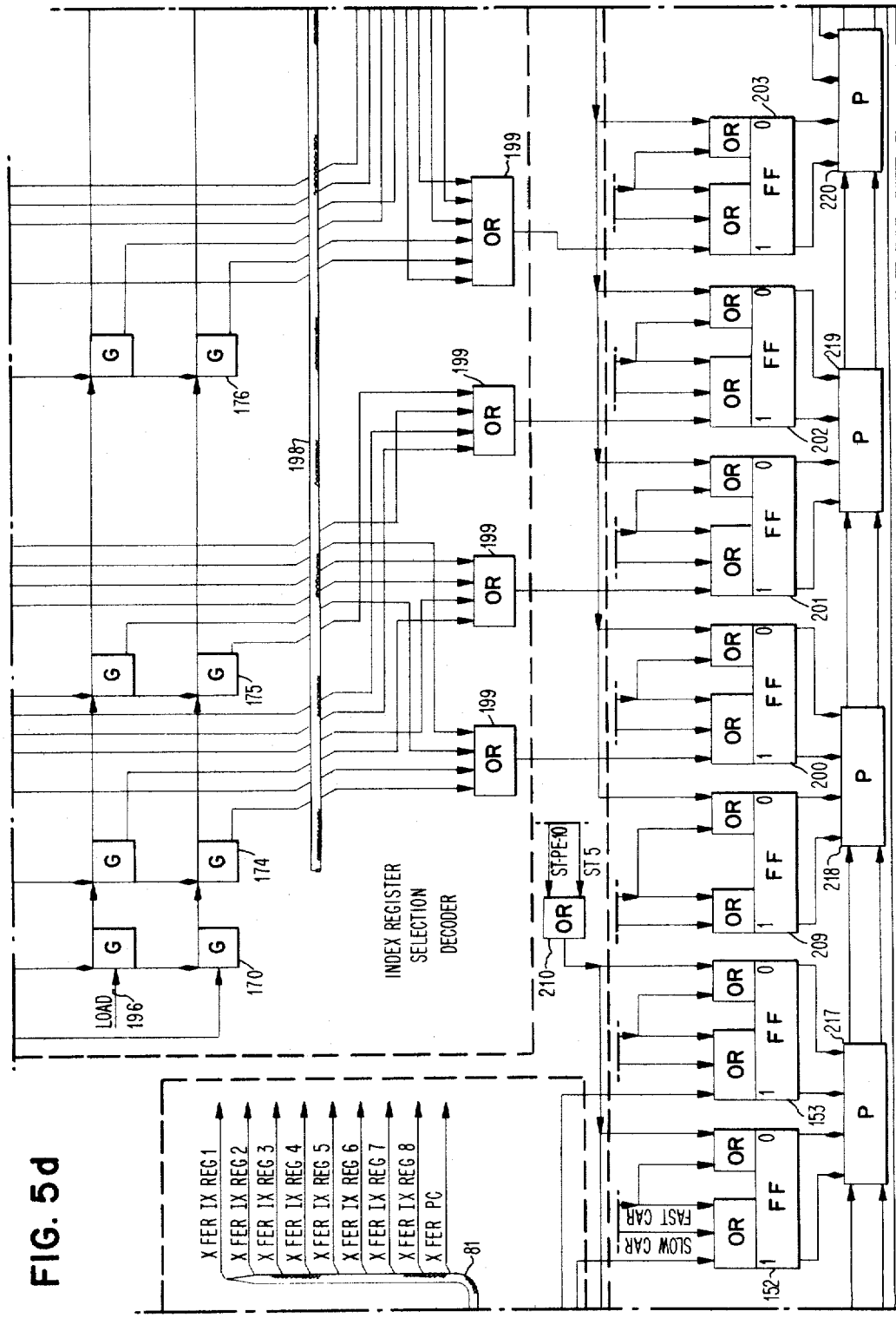

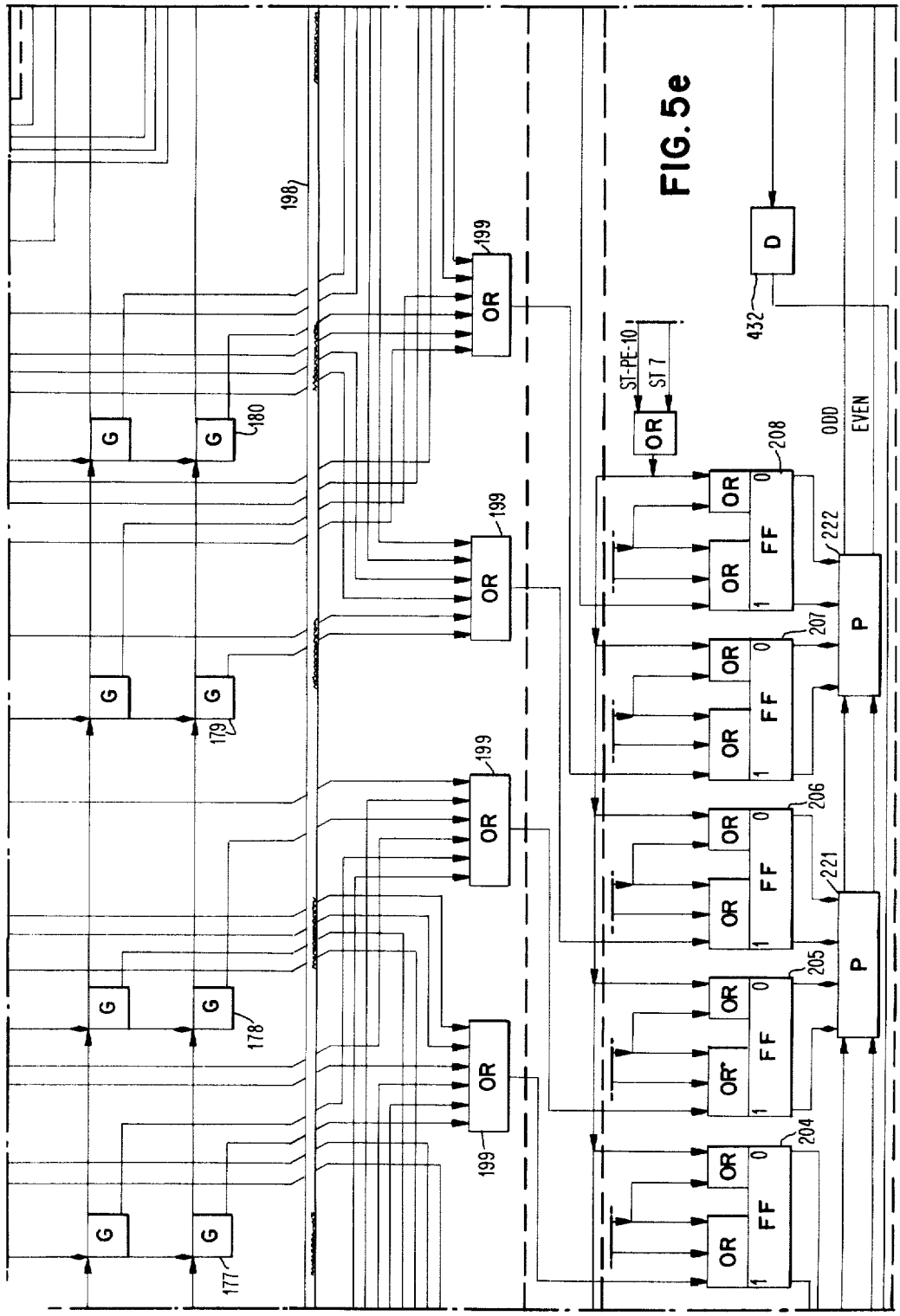

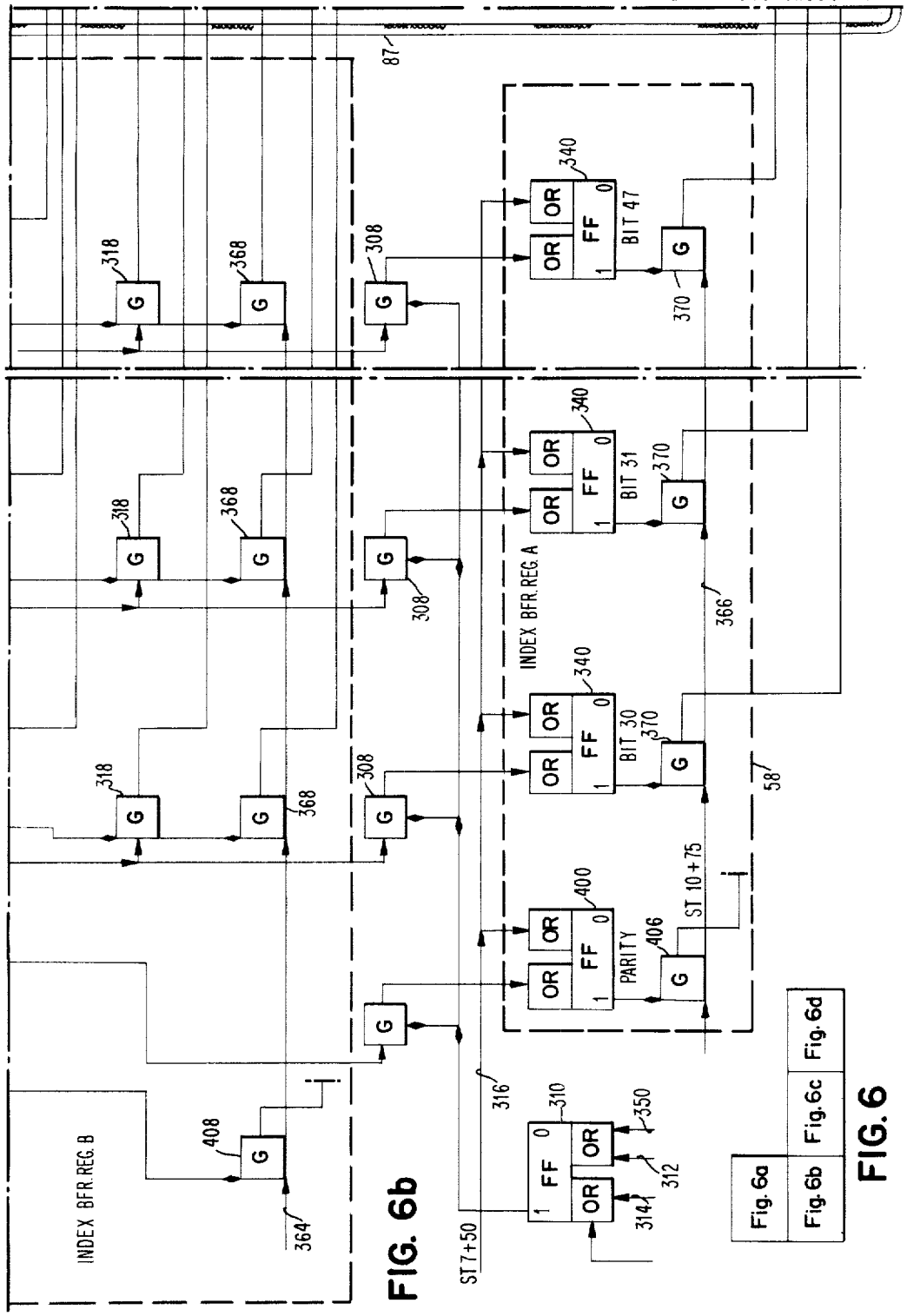

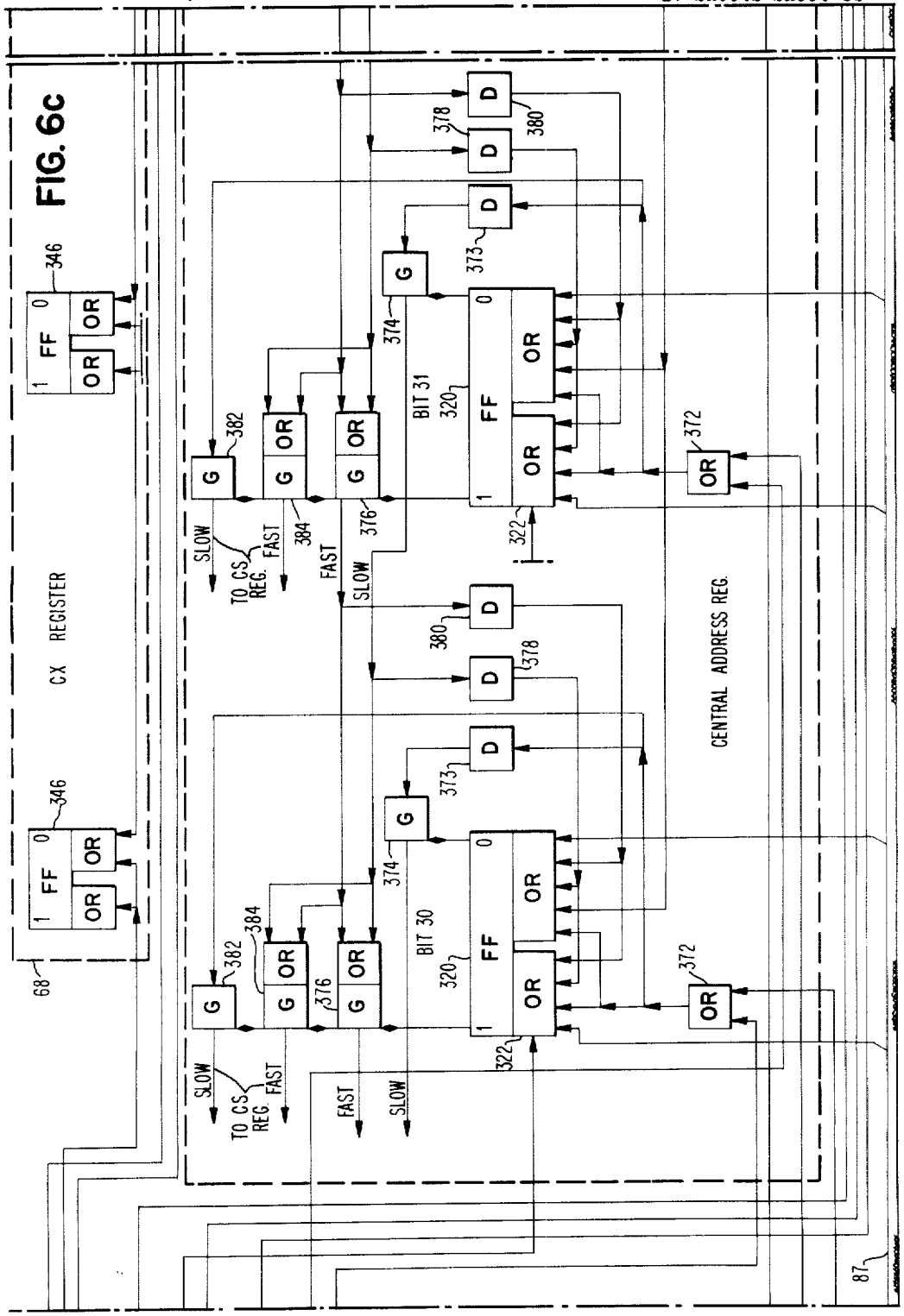

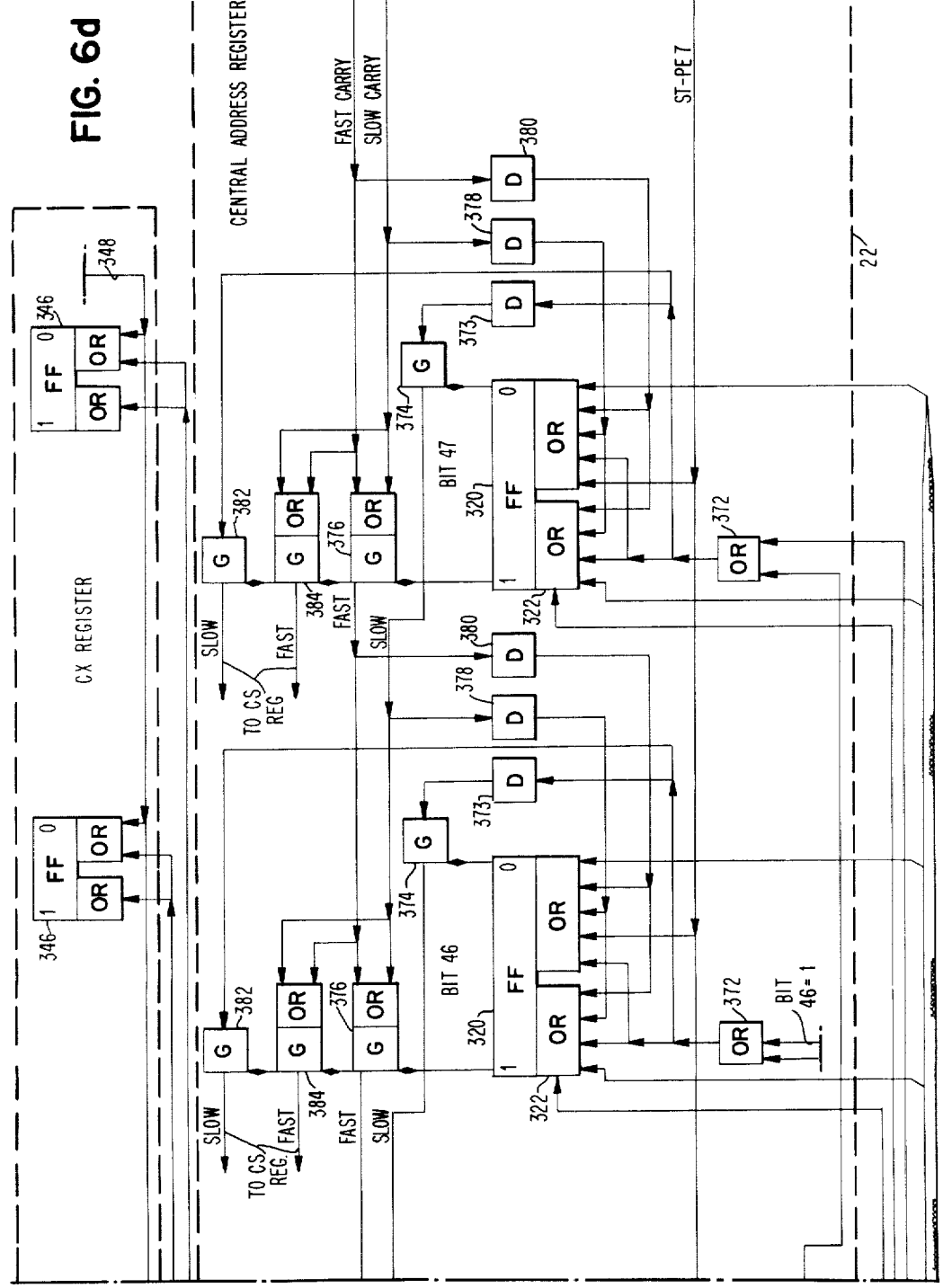

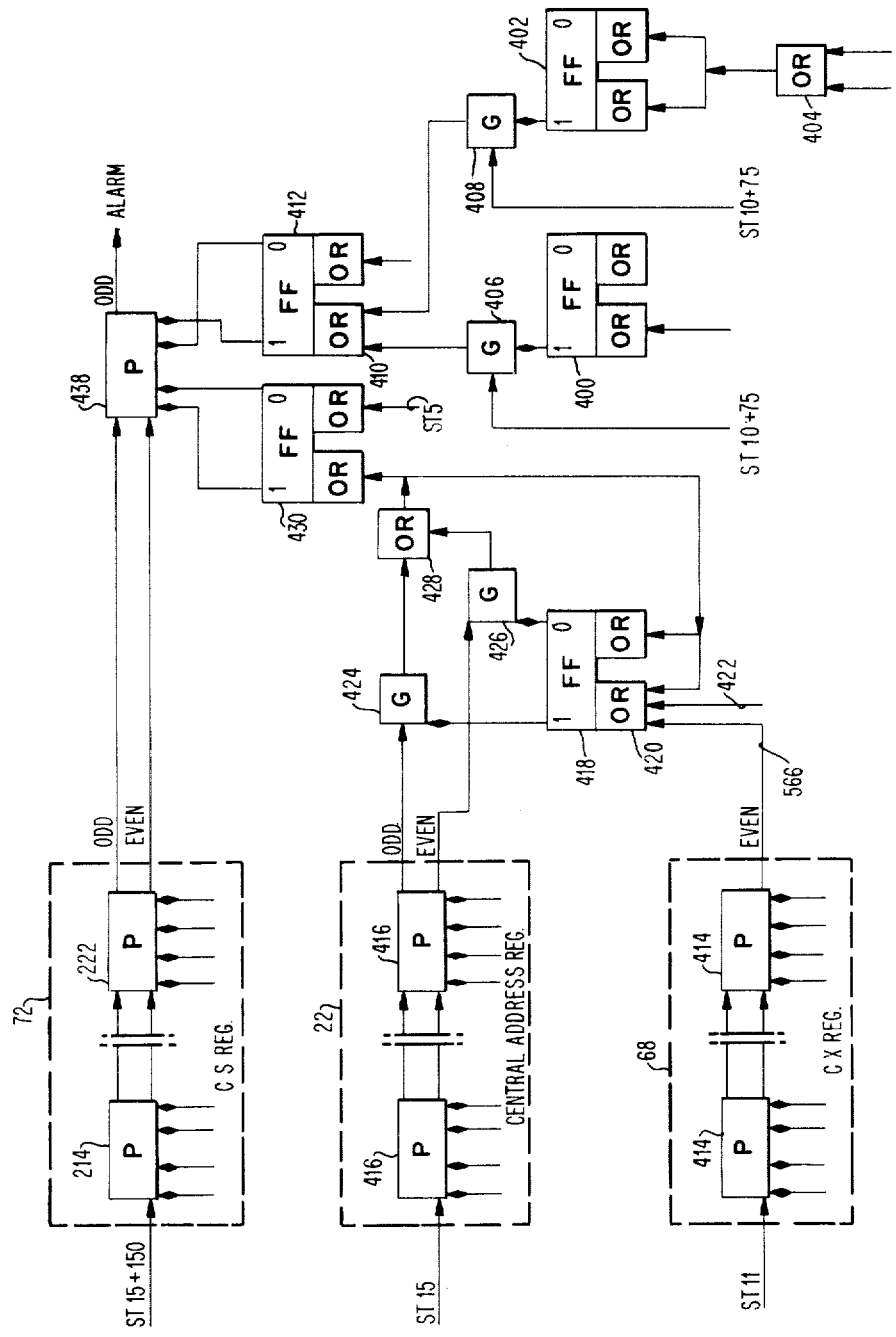

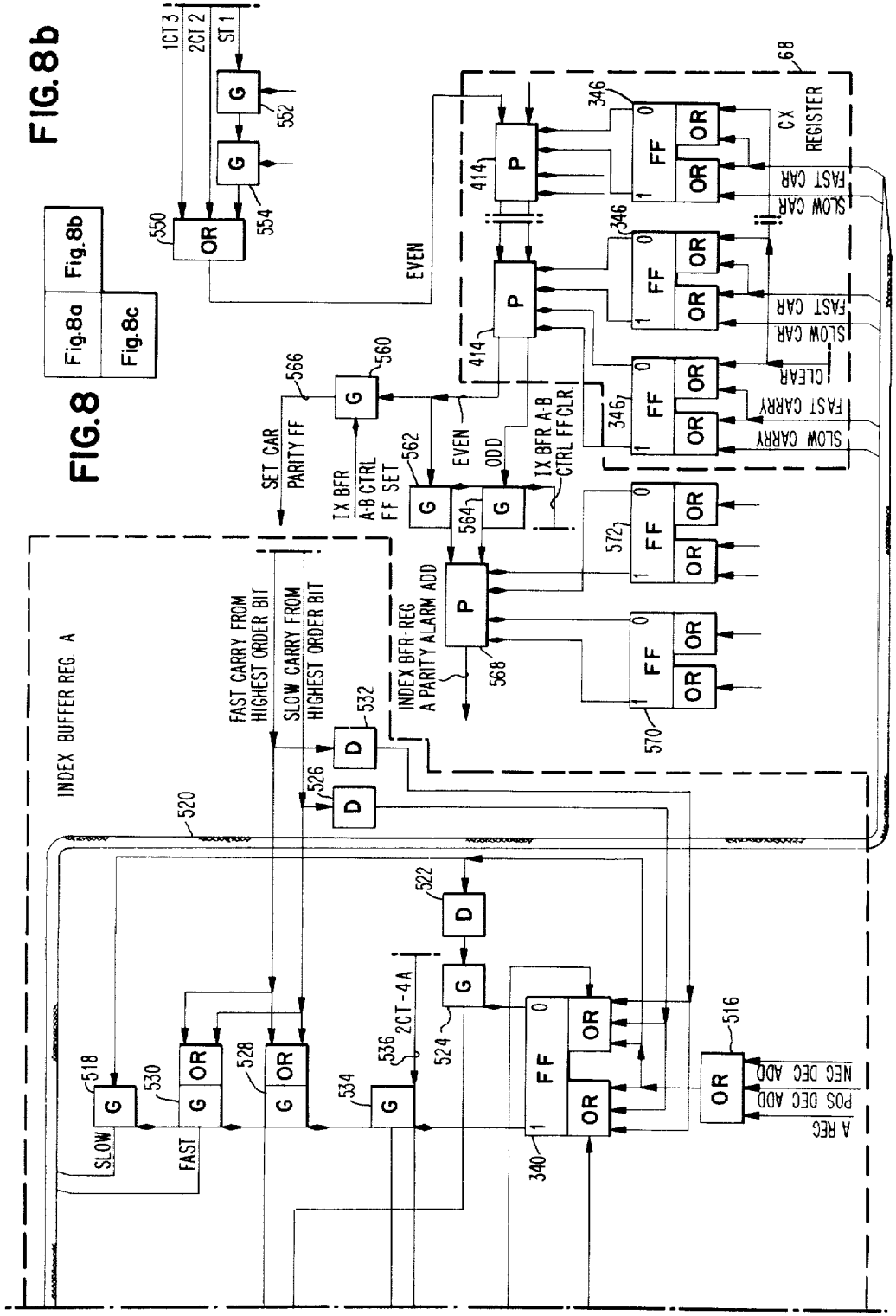

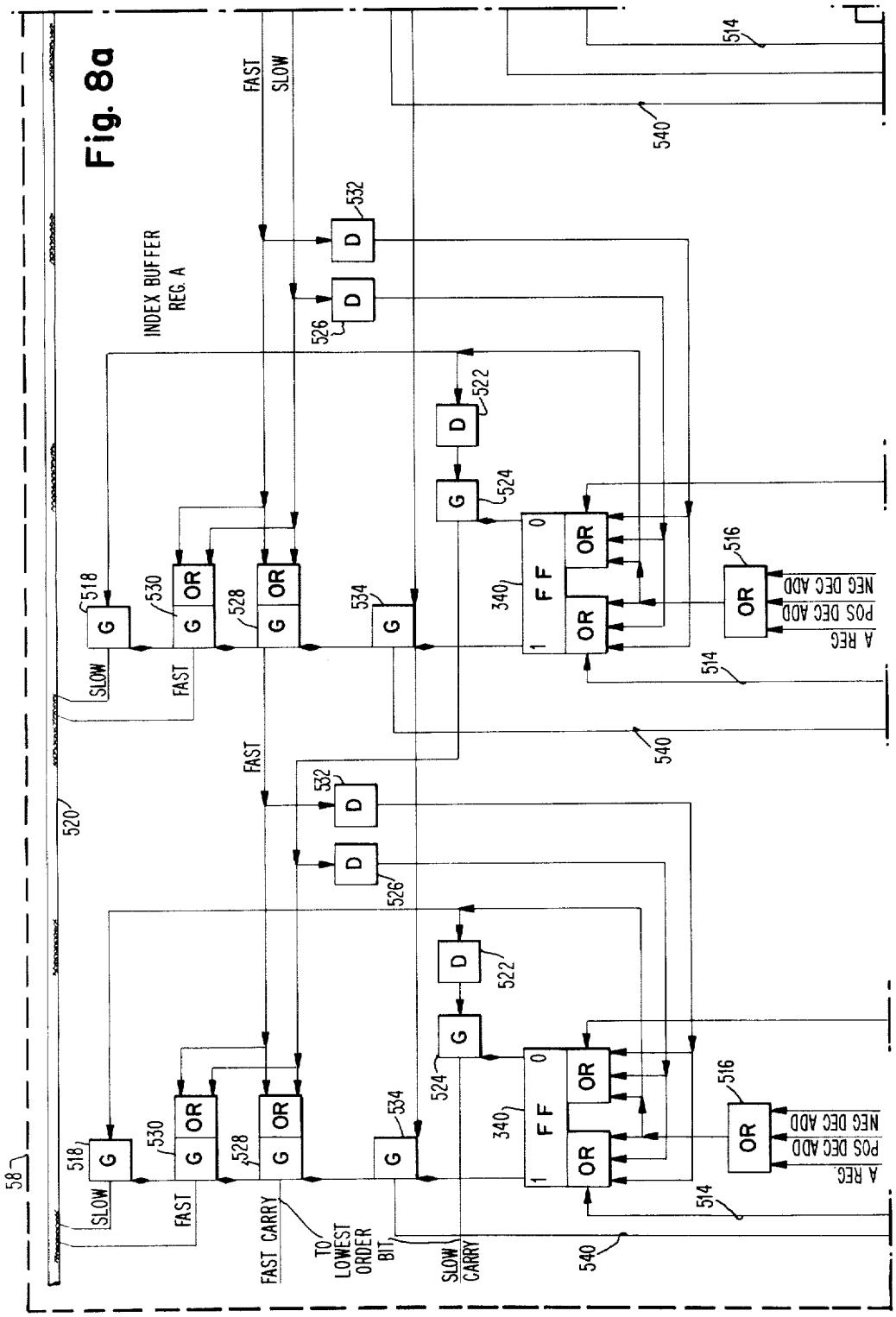

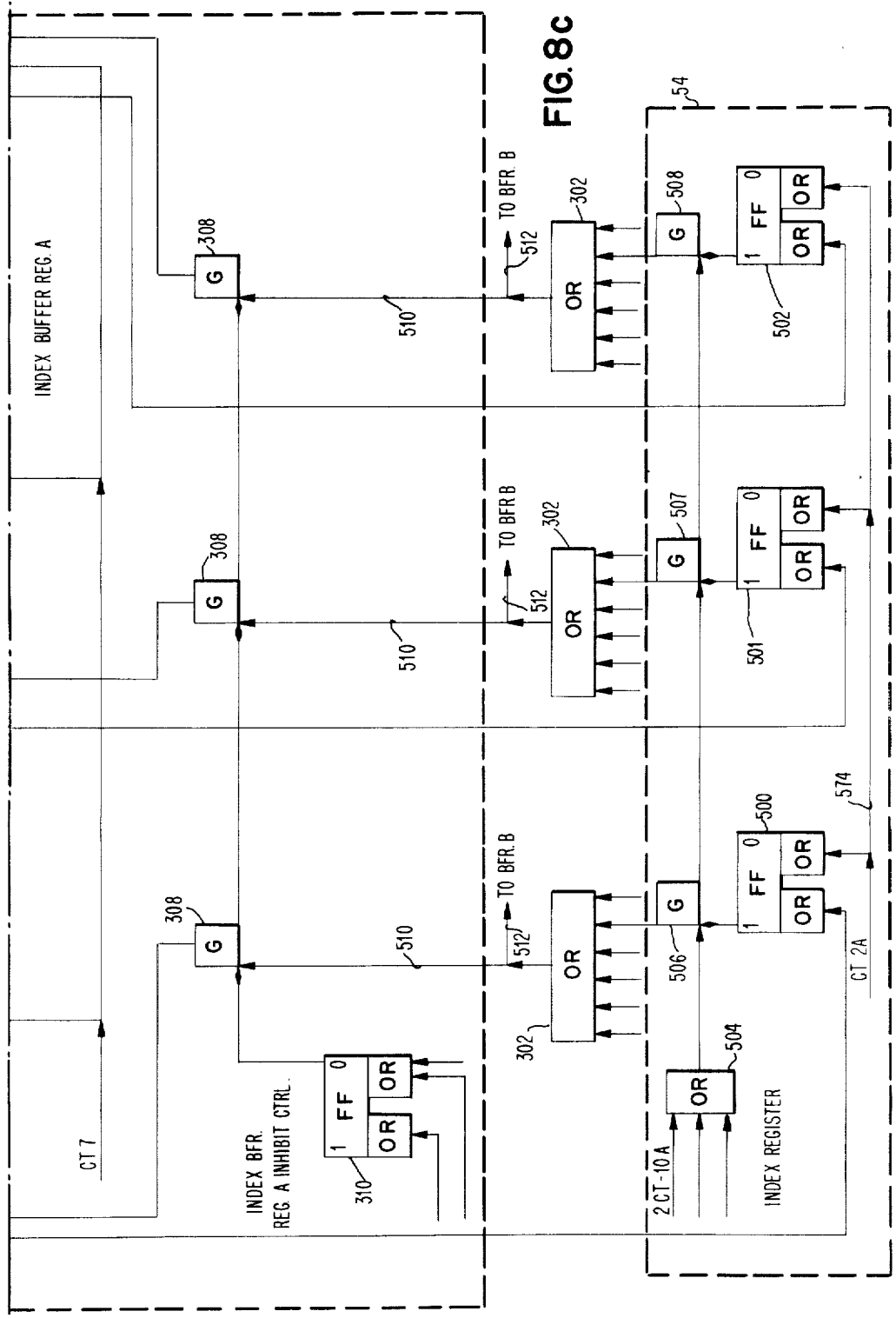

United States Patent Office 3,249,920
Patented May 3, 1966

3,249,920
PROGRAM CONTROL ELEMENT
Ralph W. Pulver, Jr., Saugerties, N.Y., assignor to International Business Machines Corporation, New York, N.Y., a corporation of New York
Filed June 30, 1960, Ser. No. 39,879
26 Claims. (Cl. 340—172.5)

This invention relates generally to electronic digital computers and similar types of apparatus and more particularly to apparatus which enable improved organization control and operation of such machines.

Digital computers and similar types of machines which employ a stored program of instructions are normally operable in response to a predetermined sequence of instructions. In general, each instruction includes an operation portion which specifies the type of data manipulation to be performed by the machine and an address portion which normally specifies the address of one or more data items in storage locations associated with the machine that are to be manipulated in accordance with the operand portion of the instruction. In order to achieve greater programming flexibility it is desirable to provide in the machine the capability of modifying the address portion of the instruction by various known values. For example, a subroutine of instructions may be run on a word stored in a specific memory address and then the same routine may be run on the word stored in the next address. By means of address modification techniques it is possible to program the machine with the same series of instructions and utilize modified and branch instructions which change the address portions of instructions by predetermined amounts and/or enable return of the program to the initial instruction of the subroutine. Frequently it may be desirable to provide greater address modification flexibility than that of a single value. In general, however, it is desirable that address modification be accomplished as rapidly as possible so that only a single cycle of machine operation time will be required and in accommodation with the accuracy and error checking criteria of the machine.

Accordingly, a principal object of the invention is to provide an improved program control element suitable for use in digital computers of the stored program type.

Another object of the invention is to provide in a high speed electronic digital computer means for modifying the address portion of an instruction by more than one value in a single cycle of machine operation.

Another object of the invention is to provide an improved and flexible program control element which includes means for recursive modification of an instruction as desired in order to achieve additional program flexibility.

A more specific object of the invention is to provide novel binary adder circuitry capable of performing addition of three values in a single machine cycle of a high speed digital computer.

A further object of the invention is to provide improved circuitry which enables more expeditious execution of arithmetic operations in digital computers.

Still another object of the invention is to provide an improved program control element for a digital computer capable of performing direct and relative address modification on a single instruction simultaneously.

Still a further object of the invention is to provide an arrangement of digital computer apparatus which enables flexible, selective and conditional address modification operations to be rapidly and efficiently performed.

Still another object of the invention is to provide in a digital computer improved means for error checking certain operations therein.

The preferred embodiment of the invention described herein is incorporated in the Program Control Element of a large (50 bit word) high speed (2.5 microsecond machine cycle) digital computer. In that Program Control Element the address portion of an instruction may be modified during a single instruction cycle by adding to it the contents of a plurality of internal storage registers in an indexing operation. This address portion may define the address of the data word to be manipulated (direct address), the address of a word which specifies the address of the data (indirect address), or the data itself which is to be manipulated in the arithmetic element (immediate address) depending on the values of tag items in the instruction. The contents of the internal storage registers may be added to the base address portion in a double indexing operation to obtain a modified address in accordance with instruction word tag bits. To accomplish an indexing operation of this magnitude (adding three eighteen bit words together) within a single machine cycle (2.5 microseconds) the apparatus employs two half adds and then a full add. In this arithmetical operation the contents of the two selected internal storage registers are half added with the half add result being stored in a first register and the carries that are generated are recorded in a second register displaced to their proper orders. The address portion of the instruction is then half added to the half add result in the first register with the carries generated as a result thereof also being stored in the second register. Each of these operations involve only the time required to select and apply the data signals to the registers and to permit them to resolve as no carries are propagated through a register to complete the addition. The contents of the first register are then added to the contents of the second register in a full add operation to provide the desired sum. As any one stage of the first register can generate only one carry at most as a result of the two half add operations there is no generation of carries in the second register during the two half add operations. In order to provide the requisite programing flexibility the circuitry incorporates two buffer registers, one which is utilized for double indexing operations and the other utilized for single indexing and index register modification operations. The apparatus is arranged so that relative addressing (based on the address of the instruction currently being processed) may be performed at the same time as an ordinary direct address modification operation. In addition the apparatus enabled the retrieval of the unmodified base address by an operation which overrides the address modification actions in response to tag bit information. Further, the apparatus includes error checking so that all single errors which result from malfunction of the program control element may be detected. The basic addition error detection philosophy utilized is based on the premise that the sum of the parity of the addend, the parity of the augend and the parity of the carries equals the parity of the sum. In the double indexing operations the parity of the addend is generated by half adding the parities of the three binary words being transferred in an effective parity updating operation. The parity of the augend is determined by generating the parity of the carries recorded in the second register. The parity of the sum is generated and compared with the parity of the augend in a parity adjusting operation (due to the multiple use of certain of the error checking circuitries) and then the parity of the carries generated in a full add operation is established and checked to determine whether the sum of the parities of the addend, augend and carries equals the parity of the sum. In addition, storage register selection and other program control element operations are also error checked.

Other objects and advantages of the invention will be seen as the following description of a preferred embodiment progresses in conjunction with the drawings, in which:

FIG. 2 is a diagrammatic layout of an instruction word of the arithmetic class of instructions used in the computer of FIG. 1;

FIG. 3 is a diagrammatic layout of an instruction word of the decrement class of instruction used in the computer;

FIG. 4 illustrates the arrangement of FIGS. 4a–b which show a block diagram of the Program Control Element of the computer of FIG. 1;

FIG. 5 illustrates the arrangement of FIGS. 5a–f which show a logical block diagram of the index register selection and decoder circuitries utilized in the Program Control Element;

FIG. 7 is a logical block diagram of a portion of the error checking control circuitry utilized in checking addition operations; and FIG. 8 illustrates the arrangement of FIGS. 8a–c which show a logical block diagram of the index register loading and modification circuitries.

In the figures of the drawings a conventional filled-in arrowhead is employed on lines to indicate (1) a circuit connection, (2) energization with a pulse and (3) the direction of pulse travel. A diamond-shaped arrowhead indicates (1) a circuit connection, (2) energization with a D.C. level, and (3) the direction of application of that level. Boldface characters appearing within a block identify the common name of the circuit represented, that is, FF designates a flip-flop, G a gate circuit, OR a logical OR circuit, $\overline{A}$ a logical NOT AND circuit, P a parity check circuit, etc. A variety of circuits suitable for the performance of each of these functions is known in the art. However, the preferred type of components are disclosed in the copending application S.N. 824,119, filed in the name of Carroll A. Andrews et al. on June 30, 1959 and entitled Magnetic Core Transfer Matrix. The basic arrangement of computer logic is the same as that of the computer system disclosed in U.S. Patent No. 2,914,248, issued to Ross et al. on November 24, 1959.

Figure 1:
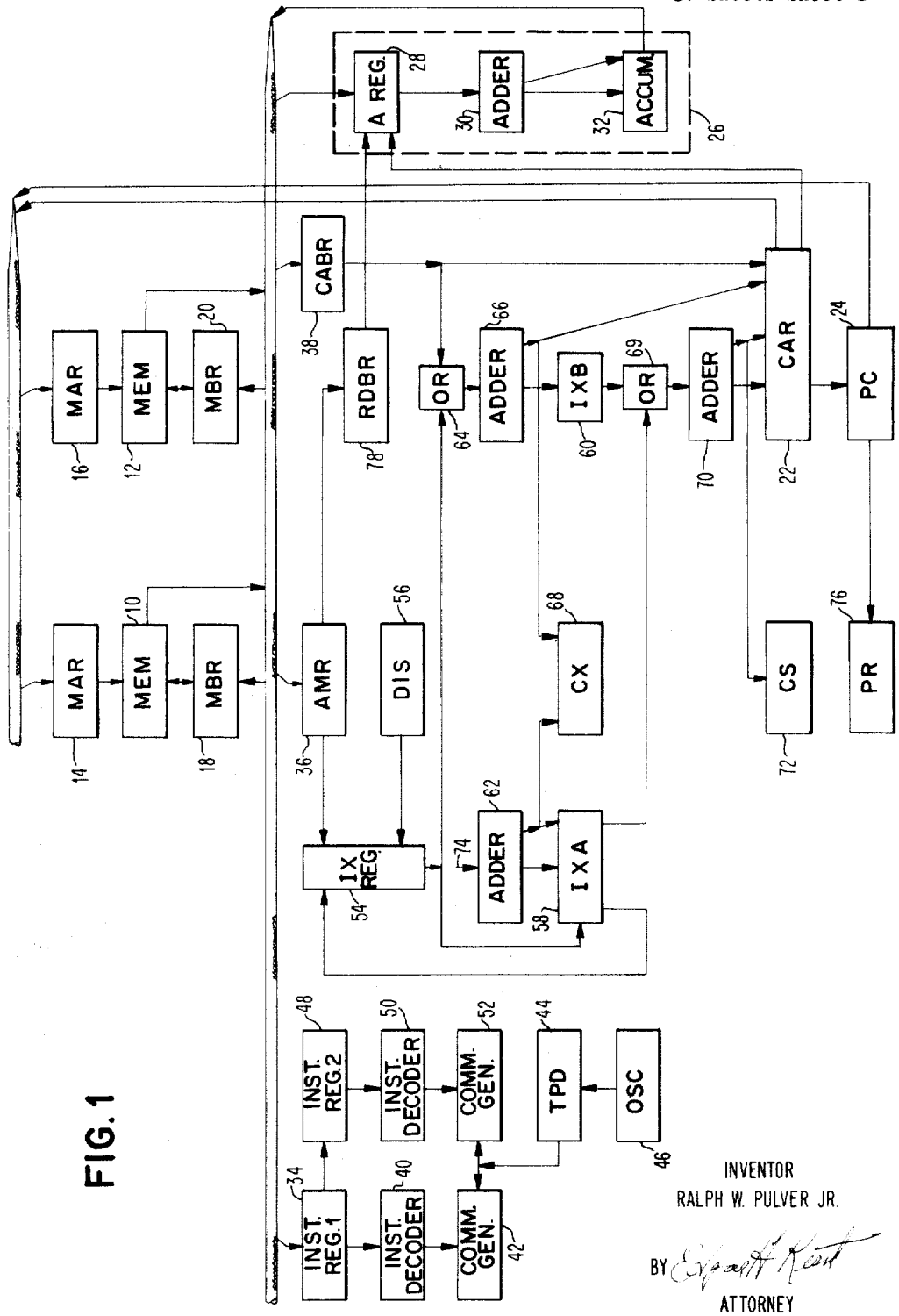
FIG. 1 is a block diagram of the computer apparatus incorporating the preferred embodiment of the invention.

The computer system in which the preferred embodiment of the invention is employed is shown in FIG. 1 in general block form. That computer utilizes a plurality of memory elements, two of which 10, 12 are shown. Associated with each memory element is a Memory Address Register 14, 16 (MAR) respectively and a Memory Buffer Register 18, 20 (MBR) respectively. The computer system is designed to permit overlapped or concurrent processing of two instructions and is arranged so that two memories may be utilized by the computer at the same time. The data word for one instruction may be withdrawn from a memory in accordance with information stored in the Central Address Register 22 (CAR) at the same time that the next instruction is read out of memory in accordance with information from the Program Counter 24 (PC). In normal overlap operation, a data word is transferred to the Arithmetic Element 26 while portions of an instruction word are substantially simultaneously transferred to the First Instruction Register 34, the Address Modification Register 36 (AMR) and the Central Address Buffer Register 38 (CABR). The Arithmetic Element 26 is shown in simplified form as including only an A Register 28, an Adder 30 and an Accumulator 32. (It will be understood of course that other components may be utilized in the arithmetic element and are in fact incorporated in the actually constructed embodiment. However, it is believed that this simplified showing of the Arithmetic Element will not detract from an understanding of the present invention.) The operand portion of the instruction word which is loaded into First Instruction Register 34 applies control signals through Instruction Decoder 40 to the Command Generator 42 so that timing pulses from the Timing Pulse Distributor 44 as driven by the Oscillator 46 may be appropriately channeled throughout the entire computer for control thereof to execute the instruction. At first level, in general, the necessary control circuitries are set up and the requisite address modification operations are accomplished. The operand is normally transferred from the First Instruction Register 34 to the Second Instruction Register 48 at the end of the first machine cycle for application through the Instruction Decoder 50 to the associated Command Generator 52 to generate those commands necessary for the execution of the instruction at second level, which typically involves the manipulation of data in the Arithmetic Element. Additional information on the overlapped mode of operation of this type may be obtained in the copending application, Serial No. 823,988, filed in the name of J. D. Newton on June 30, 1959 entitled Data Processing Machine.

The Address Modification Register 36 and the Central Address Buffer Register 38 are associated with the Program Control Element which is shown as including a set of Index Registers 54. The Program Counter 24 is also an addressable internal storage register capable of selection for address modification purposes. In the illustrated embodiment there are eight Index Registers but the system incorporates provision for expansion of this number to thirteen and it will be understood that in general, in addition to the Index Registers and Program Counter, any suitable internal storage register in the machine may be appropriately utilized by the Program Control Element. An addressable internal storage register is specified by the contents of the Address Modification Register or by the contents of the Double Index Selection Register 56 (DIS) and in an address modification operation the contents of the specified registers are transferred to either Index Buffer Register A 58 (IXA) to Index Buffer Register B 60 (IXB) through OR circuit 64 and Adder 66. Carries generated as a result of the operation of Adder 62 are recorded in the Index Buffer Register A 58 and in the CX Register 68, while carries from the operation of Adder 66 are recorded in the Central Address Register 22 and in the CX Register 68. The contents of the Central Address Buffer Register 38 are then applied through OR circuit 64 to the Adder 66 or directly to the Central Address Register 22 in a dual line transfer. If applied through Adder 66 the contents of CABR 38 are half added to the contents of IXB 60 with the carries generated being recorded in the CAR 22. Finally, in the address modification operation, the contents of either IXA 58 or IXB 60 are transferred through OR circuit 69 and Adder 70 in a full add operation to the CAR 22 with the carries also being recorded in the CS Register 72 as part of the error checking operation.

If desired, the contents of an Index Register may be modified through the use of Adder 62 and Index Buffer Register A 58 by means of information supplied over line 74. Another use of the Program Control Element is in the control of the branching operations in which the contents of the Program Counter 24 are stored in the Program Register 76 (PR) and the contents of the Central Address Register 22 are loaded into the Program Counter so that information specifies the address of the next instruction.

A Real Data Buffer Register 78 (RDBR) is also utilized to store the contents of the Address Modification Register 36 temporarily so that the information may be available in case a real data operation is to be specified by the instruction. In that case the address portion of the instruction (from AMR 36 via RDBR 78 and from CABR 38 via CAR 22) is transferred directly to the Arithmetic Element 26. This circuitry also enables the retrieval of an unmodified base address by overriding an address modification operation that is in progress.

A more detailed block diagram of the Program Control Element indicating certain control paths and data transfer cables is shown in FIG. 4.

The layout of an arithmetic instruction word is shown in FIG. 2 and the layout of a decrement class instruction word is shown in FIG. 3. Each instruction word is fifty bits in length, consisting of two parity bits and forty-eight information bits (S–47) which are shown. In arithmetic class instructions bits S–6 define the operation to be performed, bit 8 is the real data tag and if ONE, the right half (bits 24–47) of the instruction word is made available for transfer to the Arithmetic Element to be duplicated in the left and right halves thereof. Bits 9–11 specify the byte displacement or shifting of the data word as it is applied to the Arithmetic Element. Bits 12–14 denote the mode selection, specifying the manner in which the operand is to be treated in the Arithmetic Element. Bit 15 is the signed data tag which controls a specific operation in the Arithmetic Element. Bits 16–23 denote byte activity in the Arithmetic Element. (The operations controlled by bits 9–23 and the circuitries involved are not shown in detail herein as it is believed the features of this invention may be best pointed out with adequate particularly without showing or describing such details.) Bit 24 is a double indexing tag and if set (ONE) indicates that the address modification operation is to use double indexing. Bit 25 is an indirect addressing tag and if set (ONE) the data in the address portion as modified in the Program Control Element is used to specify the memory address of additional address information rather than the memory address of data. Bits 26–29 (the IX modifier) specify the Index Register or other internal storage register whose contents will be used to increment the address portion of the instruction (bits 30–47).

In the decrement class of instructions only bits S–5 are used to specify the operation and bits 6–23 are the decrement modifier, a value which is compared to or modifies the contents of the Index Register specified by the IX modifier (bits 26–29). Since the IX modifier is being used in this manner to specify an index register, direct indexing is not possible but indexing with the register specified by the DIS Register 56 is possible and hence bit 24 has significance. Also when indirect addressing is specified, direct indexing and/or double indexing is possible with each succeeding memory reference. The functions of these various bits may be better understood as the following description of the Program Control Element circuitry progresses.

Sixteen time pulses, TP0–15, are generated during each memory cycle in the computer. Each machine cycle commences at time TP–6 of the memory cycle. In the preferred embodiment these pulses occur at 156 milli-microsecond intervals so that an entire cycle is 2.496 microseconds in duration. The system memory cycle is initiated at TP0 with a Start Memory pulse. Simultaneously the computer starts to set up controls to effect the instruction in and normal indexing cycles and to set up circuits for receiving of the words from memory. The left half of the instruction word (bits S–23) is placed in first Instruction Register 34 in the Instruction Control Element, and bits 24–29 of the right half word are loaded into the Address Modification Register 36 while bits 30–47 are loaded into the Central Address Buffer Register 38. A value is already stored in the Double Index Selection Register 56 from a previous instruction and at TP–6 the level supplied over line 80 to the decoder 57 associated therewith is gated on line 81 to the selected Index Register 54 to transfer its contents over cable 82 to Index Buffer Register B 60. (Controls associated with Index Buffer Register A 58 prevent a transfer to that register at this time.) The instruction word is read directly from memory (by-passing the Memory Buffer Register) in skew fashion so that there is a finite difference between the times that the first and last bits are received by the computer due to the size of the memory and the length of the word. The memories are arranged so that bits 26–29 are the first bits received by the computer. These bits are loaded into Address Modification Register 36 and provide a level from that register to its associated decoder 83 over line 84 which is gated at TP–8 time to transfer the contents of the specified Index Register over cable 82 to Index Buffer Register A 58 and to Index Buffer Register B 60. As register 60 already holds the contents of the register specified by DIS register 56 a half add operation results, with any carries that are generated thereby being appropriately shifted on lines 85, and recorded in the Central Address Register 22 and also in the CX Register 68 (for checking purposes). Both gated decoder levels are also applied to the CS Register over lines 86 and a parity check on the CS Register 72 is run at TP–9 time with the CS Register being cleared at TP–10 time. A parity check is also run on the right half word (bits 24–47) at TP–9 time and parity is assigned to the CABR and to the AMR.

A decision is now made as to whether there will be single or double indexing, that is, address modification utilizing the contents of the register specified by Address Modification Register 36 alone or address modification utilizing the contents of that register plus the contents of the register specified by DIS Register 56. It will be noted that the Index Register specified by the DIS Register is automatically loaded into the Index Buffer Register B 60 anticipating an indexing operation. If no register is specified by Register 56 the value positive zero will be loaded into Register 60.

The Double Indexing Tag (bit 24) is now examined and a pulse is generated at TP–9+100 time.

If single indexing is specified, that is, if bit 24 is ZERO, the contents of the Central Address Buffer Register 38 are dual-line transferred by that pulse over cable 87 to the Central Address Register thus wiping out any carries that have been recorded therein. If however, the double indexing tag bit 24 is ONE the contents of the Central Address Buffer Register 38 are transferred over lines 88 in a half-add operation to the Index Buffer Register B with the carries generated as a result thereof being transferred over lines 85 to be recorded in the Central Address Register 22 and in the CX Register 68. (In an immediate addressing operation (real data tag bit 8 is ONE) the unmodified contents of both the CABR and AMR registers 36, 38 are usually transfererd to the Arithmetic Element. The contents of CABR are dual-line transferred to the CAR at TP–9+100 time (subsequent addition operations being inhibited, thus effecting a retrieval of the base address) and the contents of the AMR are transferred to Real Data Buffer Register 78 at TP–11 time for parity checking in preparation for transfer to the Arithmetic Element 26.) Then, at TP–10+75 time the contents of Register 58 are transferred over cable 89 if single indexing was specified or the contents of Register 60 are transferred over cable 90 if double indexing was specified. Each transfer initiates a full add operation through the address modification adder 70 with the contents of the Central Address Register.

The results of the full add operation are recorded in the Central Address Register 22 with the carries generated being recorded in the CS Register 72 through transfer over lines 91. A parity check is then run to determine whether the parity of the sum in the Central Address Register 22 equals the sum of the parity of the carries in the CS Register 72, the parity of the addend (the value transferred from the selected Index Buffer Register and the parity of the augend (the parity of the carries recorded in the CAR), the final check pulse being applied to the CS Register at TP–15+150.)

The contents of the Central Address Register 22 now are available for transfer to the Arithmetic Element (real data) over line 92 or to memory over lines 93a and b to specify a memory address for data (direct address) or for additional address information (indirect addressing). The contents of the Program Counter 24, which was stepped at TP-11 time, normally specify the memory address of the next instruction and are transferred over lines 94a and b.

In a branch operation upon determination that the branch condition exists, the next inspection is obtained from the address specified by the Control Address Register. The contents of the Program Counter are transferred over line 95 to the Program Register 76 and the contents of the Central Address Register, after providing the memory reference, are transferred over line 96 to the Program Counter. The following instruction address is then specified in normal fashion from the Program Counter by signals over lines 94a and b.

An Index Register 54 may be loaded or its contents modified through the utilization of the Index Modification Adder 62 and Index Buffer Register A 58 with transfer into the circuitry over cables 74, 82 and 98 and transfers from the Index Buffer Register A to the Index Register over cable 99. Certain transfer paths particularly to and from the Arithmetic Element are indicated on the block diagram of the Program Control Element shown in FIG. 4. However, as these transfer paths are not involved in operations of that portion of the computer apparatus related to the instant invention they are not described in detail.

The index register selection and the decoder check circuits are shown in greater detail in FIG. 5, include Double Index Selection Register 56 and its associated Decoder 57, the CS Register 72, the Address Modification Register 36 and its associated Decoder 83 and parity check circuitry 104. Decoder check circuitry is incorporated in the CS Register 72. The Double Index Selection Register 56 (FIG. 5c) includes four flip-flops 106, 108, 110 and 112 which are loaded with a value that specifies an index register or other addressable internal storage register by a separate instruction from bits 44–47 from the Right Accumulator in the Arithmetic Element over line 114 as indicated in FIG. 4. Also shown in the Double Index Selection Register is an Internal Address Store control flip-flop 116 which is utilized to prevent conflicts where the previous instruction is utilizing an internal register in a storage operation. Flip-flop 116 is normally cleared by an ST-15 pulse. Levels from the four bit flip-flop register 56 are applied to the decoder circuit 57 which includes eight NOT AND circuits 118–125. An ST-6 pulse is applied on line 126 to sample gate 128 and if the Internal Address Store Control flip-flop 116 has been cleared by the previous ST-15 pulse that gate is conditioned and the pulse is passed to sample the gates 130 and 132 which are conditioned by the ONE and ZERO outputs of DIS Register flip-flop 106 respectively. As illustrated there are ten addressable internal registers that may be selected with this DIS Register and Decoder arrangement with possibility of expansion to sixteen. The pulse passed by gate 130 or 132 finds one of the gates 134–143 conditioned by a level from a NOT AND circuit 118–125 and an output signal is applied over a line in cable 81 to the selected index register to transfer the contents thereof to Index Buffer Register B. The single output pulse is also applied through one of OR circuits 144 to set a single one of flip-flops 146–153 in the CS Register 72. It will be noted that outputs of each set of two gates conditioned by a single NOT AND level are applied through different OR circuits for checking purposes. Thus, if gate 134 is conditioned its output signal is applied through OR circuit 144a to set flip-flop 146 while the output from gate 136, conditioned by the same level as gate 134, is applied through OR circuit 144b to set flip-flop 147.

The Address Modification Register 36 (FIG. 5a) includes four flip-flops 154, 156, 158 and 160 which are set in accordance with bits 26–29 of the instruction word (the index selection field). The output level from flip-flop 154 if ONE conditions transfer gate 170 (and corresponding load and clear gates) and if ZERO conditions transfer gate 172 (and corresponding load and clear gates) and the output levels from flip-flops 156, 158 and 160 are applied to NOT AND circuits 162–169 so that one of those circuits provides a level to condition a similar series of gates in the output matrix. This matrix arrangement enables a single pulse to select an appropriate line for transfer of data to or from a specific internal storage register. A transfer pulse at ST-8 time samples both gates 170, 172 and is passed to sample either the set of gates 174–181 or the set of gates 182–189 in the matrix. As a result of this ST-8 pulse the contents of the selected register are transferred to Index Buffer Register B in a half add operation and are loaded into Index Buffer Register A. Additional selection operations of the index or other internal storage registers are enabled through the use of the series of gates associated with the clear lines 190, 192, and the load lines 194, 196. In the error checking operation the pulse from the condition gate in addition to being applied on the selection cable 198 is also applied through the matrix of OR circuits 199 to set a single flip-flop 200–208 in the CS Register 72. This OR circuit matrix is designed in similar fashion to the simpler matrix associated with the DIS Register so that the outputs from gates conditioned by the same NOT AND level are applied to different OR circuits.

As flip-flops 146–153 were cleared at ST-5 time by a pulse applied through OR circuit 210 and flip-flops 200–209 were cleared at ST-7 time by a pulse through OR circuit 211, as the result of the selection and transfer from two registers 36 and 56, two flip-flops in the CS Register will have been set if in fact there was no single failure. A check on this operation is initiated by an ST-9 pulse on line 212 which is applied through OR circuit 213 to establish the parity of the quantities stored in the CS Register. At the same time the DI–IX Check flip-flop 226 (FIG. 5f) is set by a pulse on line 228 applied through OR circuit 227. The pulse from OR circuit 213 runs through the parity circuits 214–222 (which are of the type disclosed in the copending patent application, Serial No. 784,281, entitled Switching Circuit, filed December 31, 1958, in the name of Joseph J. Moyer, now Patent No. 3,011,073) and if no error occurred the output pulse from parity circuit 222 is an Even pulse which is applied through OR circuit 224 to clear flip-flop 226. Therefore if operation is proper the check flip-flop 226 should be placed in the ZERO state. As a check, an ST-11 pulse on line 230 samples gate 232 which is conditioned by the ONE output of the flip-flop 226 and if that gate is conditioned, the pulse is passed to generate a decoder alarm on line 234. The pulse also is applied to OR circuit 224 to clear flip-flop 226 so that the subsequent addition checking operation may be properly accomplished. The CS Register is cleared by ST-10 pulses applied through OR circuits 210 and 211.

The flip-flop 209 in the CS Register between flip-flop 153 which is associated with the DIS Register check circuitry and flip-flop 200 which is associated with the AMR Register check circuitry is utilized in an Operate instruction for checking the proper operation of these decoding circuits and is set by a pulse during that instruction so that a decoder alarm signal will be generated on line 234 if in fact the circuitry is operating properly.

Figure 6A:
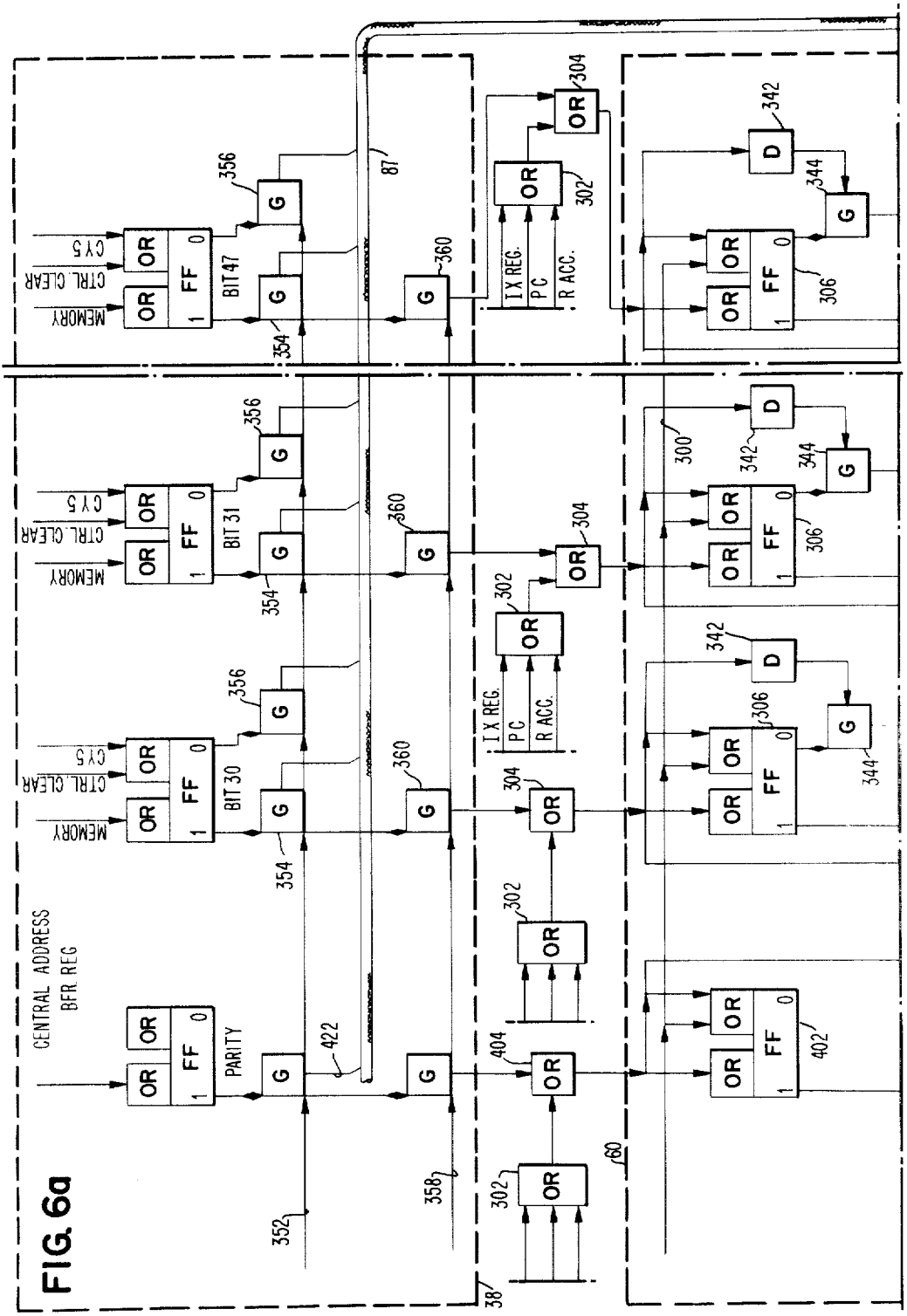
FIG. 6 illustrates the arrangement of FIGS. 6a–d which show a logical block diagram of the address modification circuitries of the Program Control Element.

The circuits directly associated with the address modification operation are shown in greater detail in FIG. 6. In that figure the Central Address Buffer Register 38, the Index Buffer Register A 58, the Index Buffer Register B 60, the CX Register 68 and the Central Address Register 22 are indicated in dashed outline. Register flip-flops and associated parity flip-flops are indicated in this figure. The Index Buffer Register B (FIG. 6a–b) is cleared by an ST-5 pulse on line 300 and, as pointed out in conjunction with the description of FIG. 5, at ST-6 time the contents of the Index Register specified by the contents of the DIS Register are read into Index Buffer Register B. The transfer path through only one stage will be described in detail as there are similar transfer paths for all the stages, including the parity recording elements. This path from the selected storage register is through OR circuits 302 and 304 to the complement input of the corresponding flip-flop 306 of the Index Buffer Register B 60. (This path is indicated generally as cable 82 in FIG. 4.) The pulse also samples gate 308 between the Index Buffer Registers A and B. This transfer gate is conditioned by the ONE output from the Index Buffer Register A Inhibit Control flip-flop 310. This flip-flop is cleared at ST–5 time by a pulse on line 314 and therefore gates 308 are not conditioned when data is transferred over cable 82 from the register specified by the DIS Register 56 and therefore no value is loaded into the Index Buffer Register A 58 at this time. An ST–7+50 pulse on line 316 clears the flip-flop in Index Buffer Register A to insure its readiness to receive a data transfer. At ST–8 time the contents of the Address Modification Register are decoded to transfer the contents of the specified storage register over the same path (cable 82) through OR circuits 302 and 304 to the corresponding flip-flops 306 of Index Buffer Register B in a half add operation. The pulse also samples gates 318 and any flip-flop 306 in the ONE state provides a conditioning level to the corresponding gate 318 indicating that a carry is to be generated from that stage. The pulses passed by gates 318 under this condition are transferred over lines 85 into the next higher stage in Central Address Register 22 (FIGS. 6c–d) in a carry recording operation and it into the corresponding stage of the CX Register 68 as an initial step in establishing the parity of the augend for error checking purposes. Thus from the highest stage (bit 30) of Register 60 the carry indication is passed to set the flip-flop 320 in the lowest stage (bit 47) of the Central Address Register 22 through OR circuit 322. Similarly a carry out from the lowest stage of Index Buffer Register B (stage 47) (gate 318 being conditioned) is applied through an OR circuit 322 to set the flip-flop 320 in stage 46 of the Central Address Register. (The set input to flip-flop 320 (stage 31) is not shown connected in the drawing as it emanates from stage 32 of Index Buffer Register 13 which is not shown in the drawing.) The pulses applied to each flip-flop 306 also sample the transfer gates 308 and as the control flip-flop 310 has been set by a ST–7+50 pulse those gates are conditioned and the signals are passed to set the corresponding flip-flops 340 in the Index Buffer Register A 58. Also the pulse passed by OR circuit 304 in addition to complementing the flip-flop 306 is also applied to the 100 millimicrosecond delay unti 342 and after that delay samples gate 344 which is conditioned by the ZERO output of flip-flop 306. If the flip-flop 306 was initially in its ONE state the pulse applied to its complement input has switched it to the ZERO state (indicating that ONE was added to ONE and a carry generated), the gate 344 is now conditioned and the carry signal is passed to a flip-flop 346 in the CX Register 68 (FIG. 6c–d) to decord the effect of that carry. This carry signal is passed to the corresponding stage in the CX Register as the carry signal passed to the Central Address Register 22, the CX Register having been previously cleared by a pulse on line 348 at ST–7 time. The adder and carry generation circuitry associated with the Index Buffer Register B is of the same type as that disclosed in the copending application, Serial No. 823,996, entitled Adder Circuit, filed July 30, 1959, and in the names of Eddie T. Hall, John D. Newton and James R. Wood, now Patent No. 3,042,304, with the modification that a separate register stores the carries rather than allowing them to propagate through the augend register during the half add operations.

To summarize the condition of the various registers at this point—Index Buffer Register A contains the value from the storage register specified by the Index Selection field (bits 26–29); Index Buffer Register B contains the half add sum of the values from the two registers specified by the Index Selection field and the Double Index Selection Register; and the Central Address Register and the CX Register both contain the same carry values generated as a result of the addition operation.

The control flip-flop 310 is cleared by an ST–9 pulse on line 350. At ST–9+100 the double indexing tag (bit 24) is sampled and a pulse is passed on line 352 to sample gates 354 and 356 if bit 24 is ZERO while the pulse is passed on line 358 to sample gate 360 if bit 24 is ONE. If double indexing is not specified (bit 24=0) the contents of the Central Address Buffer Register 38 are dual-line transferred over cable 87 to the corresponding stages of the Central Address Register, wiping out the carries that were recorded there. That is, both sides of each flip-flop in the Central Address Buffer Register are sampled and the resultant pulse sets the corresponding flip-flop in the Central Address Register to the same state as the CABR flip-flop. However, if double indexing is specified (bit 24=1) the ST–9+100 pulse is applied on line 358 to sample gates 360 and transfer the ONE contents of the Central Address Buffer Register 38 through OR circuits 304 to the complement inputs of the flip-flops 306 of the Index Buffer Register B 60. This results in a second half add operation being accomplished with the resulting carriers being recorded via gates 318 in the shifted order of the Central Address Register and via gates 344 in the corresponding order of the CX Register. As gates 308 are not conditioned the contents of the Index Buffer Register A are not affected.

Finally, at ST–10+75 time a pulse is applied on line 364 if double indexing was specified and on line 366 if double indexing was not specified to sample gates 368 or 370 respectively and transfer the contents of either Index Buffer Register B or Index Buffer Register A to the Central Address Register in a full add operation, the transferred signals being applied through OR circuits 372 to the complement inputs of the Central Address Register flip-flops 320. This adder operates in substantially the same manner as the apparatus disclosed in the above-referenced copending patent application, Serial No. 823,996. A signal (ONE) passed through OR circuit 372 complements flip-flop 320 and simultaneously is passed through a delay unit 373 of 100 millimicroseconds (to permit the flip-flop to resolve) and then samples gate 374 (conditioned by the ZERO output) to generate a slow carry if the flip-flop was initially in the ONE state. As each stage can generate only one carry, each slow carry is applied without delay to sample the fast carry gate 376 of the next stage (conditioned by the ONE output). Each slow or fast carry pulse that is generated complements the flip-flop 320 in the next higher stage (being passed through delays 378, 380 and a carry indication also is passed by gates 382 or 384 respectively to the CS Register in a carry recording operation.

When the adder has completely resolved the sum of three eighteen bit words, the contents of the index register specified by the DIS Register, the contents of the index register specified by the AMR Register and the contents of the Central Address Buffer Register, have been added together if double indexing was specified in less than one and one-half microseconds. As the program counter is addressable it is possible to use its contents in a relative addressing operation selecting it with the DIS registers for example, and to further modify the address through specifying another register with the contents of the Address Modification Register. Also, if double indexing was not specified the flexible apparatus of the invention enables normal single indexing to be performed in the same time interval. The modified address portion of the instruction is available in the Central Address Register for use in the memory addressing operation which commences at ST–0 time.

The following simplified example illustrates the type of bit manipulations that are performed in the addition of three binary numbers in this manner. Assume five bit values with the Index Register specified by the DIS Register containing 01001; the Index Register specified by the Index Selection field containing 11100 and the Central Address Buffer Reigster containing 00111.

|  | Index Buffer A | Index Buffer B | CAR |
|---|---|---|---|
| ST-5 | 00000 | 00000 | 00000 |
| ST-6 | 00000 | 01001 | 00000 |
| ST-8 | 11100 | 10101 | 10000 |
| ST-9+100 | 11100 | 10010 | 11010 |
| ST-15 | 11100 | 10010 | 101100 |

If double indexing is not specified the condition of the registers would be as follows:

|  | Index Buffer A | Index Buffer B | CAR |
|---|---|---|---|
| ST-5 | 00000 | 00000 | 00000 |
| ST-6 | 00000 | 01001 | 00000 |
| ST-8 | 11100 | 10101 | 10000 |
| ST-9+100 | 11100 | 10101 | 00111 |
| ST-15 | 11100 | 10101 | 100011 |

Additional flexibility is provided by the address modification overriding feature responsive to tag bit 8 which, if set, would cause the final CAR contents to be 00111.

The full add parity check arrangement utilized in this apparatus is shown in logical block form in FIG. 7. A portion of this circuitry (including the complete CS Register circuitry 72) is also shown in FIG. 5 and the parity flip-flops 400, 402 associated with the Index Buffer Register A and B are shown in FIG. 6. As mentioned previously the full add parity check operation compares the sum of the parities of the addend (the quantity transferred from either Index Buffer Register A or Index Buffer Register B), the augend (the quantity in the Central Address Register) and the sum of the carries generated in the full add operation with the parity of the resulting sum.

As shown in FIG. 7 the parity of the quantity stored in Index Buffer Register A is placed in flip-flop 400 and the parity of the quantity stored in Index Buffer Register B is indicated by flip-flop 402. The latter is an "updated parity" due to the fact that three numbers are stored in that register. As shown in FIG. 6, the transfer paths of the parity bits are similar to the transfer paths for data bits. (In the operating computer embodiment the CABR contents are transferred before its parity bit due to timing considerations, and delay circuits are utilized in the channeling of this parity information to and from Index Buffer Register B.) During each transfer of a value into the Index Buffer Register B the associated parity bit is applied through OR circuit 404 to the complement input of flip-flop 402. The parity indication after the first half add is in error but the second half add corrects it so that the status of flip-flop 402 accurately indicates the parity of the quantity then stored in the Index Buffer Register B. The parity status of the register whose contents are transferred to the Central Address Register is transferred at the same time (ST-10+75) through either gate 406 or gate 408 and OR circuit 410 to the CAR Addend parity flip-flop 412 which was cleared in anticipation of the address modification operation. Thus at time ST-10+75, depending on the type of indexing operatoin, a pulse samples either gate 406 (single indexing) or gate 408 (double indexing) and transfers that parity indication to flip-flop 412 as the parity of the addend.

The Central Address Register 22, the CX Register 68 and the CS Register 72 all contain eighteen stage flip-flop registers of the type shown in FIG. 5 (CS Register flip-flops 147–153 and 200–209) and in FIG. 6 (Central Address Register-flip-flops 320 and CX Register-flip-flops 348). Parity circuits are associated with each of these registers in the same manner as shown in FIG. 5 for the CS Register. Thus parity circuits 414 are associated with the outputs of CX Register flip-flops 348 and parity circuits 416 are associated with the outputs of the Central Address Register flip-flops 320.

The CX Register 68 stores carry indications generated as a result of the half add operations and the parity circuits 414 associated with the CX Register are sampled by an ST-11 pulse if double indexing is specified and the resultant parity indication of the augend (the quantity stored in the CAR), if even, sets the CAR parity flip-flop 418 through OR circuit 420. If, however, single indexing was specified the contents of the CABR 38 are dual-line transferred to the CAR 22 and the parity bit from CABR 38, if even, is applied over line 422 through OR circuit 420 to set flip-flop 418. At ST-15 time the parity circuits 416 associated with the CAR 22 are sampled and the resultant parity output is compared with the augend parity by sampling the gates 424 and 426 one of which is conditioned by an output level from the CAR Parity flip-flop 418. An output pulse from a gate indicates a difference between the parities of the augend and the sum and this indication is applied through OR circuits 428 to set the CAR Parity compare flip-flop 430. (This flip-flop is initially cleared by an ST-5 pulse.) The difference indication is also applied to the complement input of the CAR Parity flip-flop 418 so that it correctly indicates the parity of the word then stored in the CAR. At time ST-15 a pulse samples gate 430 (FIG. 5) and is passed through 150 microsecond delay unit 432 and OR circuit 213 to the CS Register parity circuits 214–222 to establish the parity of the carries generated during the full add operation. The resultant parity indication is gated by gate 434 or 436 (FIG. 5) and applied to the parity circuit 438. The inputs to this parity circuit are arranged so that an odd parity output signal produces a parity alarm. As indicated above, all these parity circuits may be of the type disclosed and described in detail in the Moyer Patent 3,011,073. Thus the parity of the addend (from Index Buffer Register A or B), updated as necessary, is indicated by flip-flop 412. The parity of the addend (the carries stored in the CAR or the contents of the CABR) compared with the parity of the full add sum is indicated by the flip-flop 430. The outputs of these two flip-flops are applied to the parity circuit 438 to which a signal indicative of the parity of the full add carries is applied. If the sum of the parities of the addend, augend and carries equals the parity of the sum there has been a satisfactory addition operation.

The logical block diagram of circuitry for index register loading and modification is shown in FIG. 8. In that figure there is shown the Index Buffer Register A 58 (FIG. 8a–b), one of the Index Registers 54 (FIG. 8c), the CX Register 68 (FIG. 8b) and associated circuitry used for checking purposes. As indicated in that figure each Index Register 54 includes a series of flip-flops 500, 501, 502, only three of them being shown, it being understood that each of these registers are eighteen bit registers. The data in the Index Register or other selected internal storage register is transferred by a pulse applied through OR circuit 504 to sample gates 506–508 and the outputs therefrom are applied through OR circuits 302 to the Index Buffer Register A 58 over lines 510. The transfer path as above indicated also includes transfer to Index Buffer Register B along lines 512 (lines 510 and 512 being included in cable 82).

The Index Buffer Register A includes the index modification adder circuitry and a flip-flop storage register comprising flip-flops 340. The associated adder circuitry is of the same type as the address modification adder 70 associated with the Central Address Register 22 and as shown in the above-mentioned Patent No. 3,042,304. The transfer from the Index Register to the Index Buffer Register A is controlled by the control flip-flop 310 which, when set, conditions gates 308. It will be noted that the arrangement of the Index Register selection circuits enables the use of a single gate 308 in each stage for control of the transfer from any one of the Index Registers to the Index Buffer Register A. It is also clear that the same transfer path is used in the address modification operations as well as the index loading and modification operations. Therefore index modification and address modification using register 58 cannot occur during the same machine cycle. Address modification is carried out at first level while index modification occurs at second level with the exception of the Decrement class instructions in which index modification occurs at first level. Due to that fact, only address modification with the value specified by the DIS Register is possible during the first level of such instructions. (Of course, double indexing is permissible if indirect addressing is employed on the subsequent modification cycles.)

Data transferred through gates 308 are applied to the ONE inputs of the corresponding flip-flops 340 over lines 514. The quantity to be added to this value may be supplied from the A Register 28 or the Instruction Register 34 (the decrement field (bits 6–23)) through OR circuits 516 to the complement inputs of the flip-flops 340. As is the case in adders of this type the pulse is also passed to sample gate 518 as conditioned by the ONE side of the flip-flop to indicate generation of a slow carry over cable 520 for storage in the CX Register 68 and through a one hundred millimicrosecond delay unit 522 to sample gate 524 (conditioned by the ZERO output) after the flip-flop 340 has resolved and pass a slow carry signal, if needed, which is applied to the complement of the next higher stage via delay unit 526 and simultaneously to sample the fast carry gates 528, 530 of that stage, the fast carry gates being conditioned by the ONE outputs of the flip-flops 340. If these gates are conditioned the fast carry pulse is passed immediately (without waiting for the flip-flop to be complemented) to the complement input of the next higher stage via delay unit 532, to sample gates 528, 530 of that stage, and for recordation in the CX Register 68 over cable 535. After the completion of the addition the gates 534 are sampled by a pulse on line 536 and the quantity stored in the Index Buffer Register A is transferred over lines 540 (cable 99) to the selected Index Register.

A parity check operation is then run on the addition result, a pulse being passed through OR circuit 550 to sample the chain of parity circuits 414 (FIG. 8b). It will be noted that the OR circuit 550 has three inputs, one through gates 552 and 554 conditioned by control levels during the parity checking of the half add carries generated involved in the above-described address modification operation. The other two inputs (lines 556 and 558) are utilized to check index modification operations. As these parity circuits 414 are used in two checking operations the gates 560, 562 and 564 are used to appropriately channel the output. Thus gate 560 is conditioned during double indexing address modification operations so that an Even parity indication may be passed to set the CAR Parity flip-flop 418 on line 566 while gates 562 and 564 are conditioned during index modification operations. The signal passed by one of these gates is applied to parity circuit 568 which has inputs from an Index Buffer Register A Compare flip-flop 570 and an Index Buffer Register A Addend flip-flop 572 each of which functions in the same manner as the similar components utilized in the above-described full add address modification checking operation.

The sequence of pertinent command pulse generated during an index Register Load Instruction (LDX) is as follows. The Index Buffer Register A is cleared at 2CT-7 time (second level) as a normal double indexing cycle may be executed during first level decoding. The Index Register to be loaded is selected at 2CT-8 time by decoding the XR modifier bits (20–23) in the instruction word. At 2CT-12 time the contents of the A Register 28 are loaded into the Index Buffer Register A through OR circuits 516. At 2CT-2 time the selected index register is cleared by a pulse on line 574 to prevent a logical add and the actual loading takes place at 2CT-4 time by a transfer over lines 540.

Where a decrement class instruction is used to modify an Index Register in, for example, the Branch and Add to Index Instruction (BAX), the Index Buffer Register A control flip-flop 310 are cleared at 1CT-7 time. The IX modifier (bits 26–29) is decoded at 1CT-8 time and the contents of the selected Index Register are transferred to the Index Buffer Register A at 1CT-10 time. The Decrement modifier is then applied through OR circuits 516 in an addition operation at 1CT-13 time. At 1CT-2 time the selected Index Register is cleared and at 1CT-4 time the contents of the Index Buffer Register A are transferred to that Index Register. (Similar operations occur in an index register loading operation with the addition of clearing the Index Buffer Register A at 1CT-11 time.) During this time the contents of CABR 38 may be modified by the contents of the Index Register specified by DIS Register 56. The contents of that register were decoded at 1CT-6 time to initiate transfer of the selected Index Register contents to Index Buffer Register B. At 1CT-9+100 time the contents of CABR 38 are half added to the contents of Index Buffer Register B with carries being recorded in the CAR 22. Then at 1CT-10+75 time the full add is initiated so that the branch address is in CAR 22 and it is used to directly specify to the selected memory the address of the next instruction, commencing at 1CT-0 time. In addition, the contents of the Program Counter 24 are transferred to the Program Register at 1CT-3 time and the contents of the CAR 22 are transferred to the Program Counter at 1CT-4 time so that the series of instructions in the subroutine to which the computer has been branched will be specified in normal order by the Program Counter.

A variety of other instructions may of course be performed with the computer incorporating this improved Program Control Element. The flexibility of programming that this system enables greatly increases the versatility of such machines.

For example, the address modification operation enables double modification of the address portion of an instruction within the fraction of a single machine cycle available for such modifications. The system also is designed to enable indexing with the contents of one internal storage register while simultaneously modifying the contents of a second storage register. Further, direct and relative indexing may be simultaneously performed within a single machine cycle. The apparatus also provides means for overriding address modification operations. In addition to the speed and flexibility features of this apparatus, it also incorporates novel error checking circuitry which enables concurrent single error detection of these various operations within the system's 2.496 micro-second machine cycle. Other advantages and features of the described computer system will be obvious to those familiar with the computer art. It will be seen by those skilled in this art that the described apparatus may be modified in various manners within the scope of the invention and that the invention may be practiced with other circuitries than those described. Therefore, while a preferred embodiment of the invention has been shown and described herein it will be understood that the invention is not intended to be limited thereto or to details thereof and departures may be made therefrom within the spirit and scope of the invention as defined in the claims.

I claim:

1. In a data processing machine operable in a sequence of instruction cycles in accordance with a program of instructions with each instruction cycle comprising an instruction time during which an instruction read out of memory is decoded and address modification performed, and an execution time during which the operation specified by the instruction is executed, means for modifying an instruction by adding thereto more than one value during the instruction time of a single instruction cycle comprising a plurality of internal storage registers, means for storing numbers in said internal storage registers, means for storing an instruction, said instruction including a first portion indicating the operation to be executed, a second portion controlling the use of a first internal storage register, a third portion controlling the use of a second internal storage register and a fourth portion indicating a memory address, and means responsive to said second and third portions for adding the numbers stored in said first and second registers to said fourth portion in an index operation during the instruction time of one instruction cycle of said machine for modifying said fourth portion so that a modified address portion is available to specify a memory location before the start of the execution time of said one instruction cycle.

2. The apparatus as claimed in claim 1 wherein said single instruction includes an address modification controlling portion, and further including means responsive to said address modification controlling portion to selectively inhibit the addition of both of the numbers stored in said first and second registers to said address portion.

3. The apparatus as claimed in claim 1 and further including means for overriding the addition operation to enable subsequent use of the original value of said fourth portion of said instruction in said data processing machine.

4. In a data processing machine operable in a sequence of instruction cycles in accordance with a program of instructions, instruction modification apparatus comprising a plurality of internal storage registers, means for storing information in said internal storage registers, means for storing an instruction having an operand portion and an address portion, means for selecting two internal storage registers, the contents of said selected registers and said address portion representing three numbers, address portion modification apparatus responsive to said operand portion including first and second storage means, means for applying two of said numbers to a half adder for generating a first half add sum, means for storing said first half add sum in said first storage means, means for recording any carries produced in conjunction with the generation of said first half add sum properly displaced in said second storage means, means for applying the third number and said first half add sum to a half adder for generating a second half add sum, means for storing said second half add sum, means for recording any carries produced in connection with the generation of said second half add sum properly displaced in said second storage means, and means for applying said second half add sum and the contents of said second storage means to a full adder for generating a modified address portion.

5. The apparatus as claimed in claim 4 wherein said instruction includes an address modification controlling portion, and further including means responsive to said address modification controlling portion to selectively inhibit the addition of one or both of the numbers stored in said selected registers to said address portion.

6. In a data processing machine operable in a sequence of instruction cycles in accordance with a program of instructions, instruction modification apparatus comprising a plurality of internal storage registers, means for storing information in said internal storage registers, means for storing an instruction having an operand portion, an address portion and an instruction modifying controlling portion, means responsive to the instruction modifying controlling portion of a single instruction for selecting two internal storage registers, the contents of said selected registers and said address portion representing three numbers, address portion modification apparatus responsive to the operand portion of said single instruction including first, second and third storage means, means responsive to the instruction modifying controlling portion of said single instruction for half adding two of said numbers, means for storing the half add sum in said first storage means, means for recording any carries properly displaced in said second storage means, means for simultaneously storing one of said two numbers in said third storage means, means responsive to said instruction modifying controlling portion of said single instruction for half adding the third number to said half add sum, means for storing the result thereof, means for recording any carries properly displaced in said second storage means, means responsive to said instruction modifying controlling portion for transferring said third number to said second register erasing the carries stored therein and means responsive to said instruction modifying controlling portion of said single instruction for adding the contents of either said first storage means or said third storage means to the contents of said second storage means to provide a modified address portion of said single instruction.

7. In a data processing machine operable in a sequence of instruction cycles in accordance with a program of instructions as controlled by a program counter the contents of which normally specify the address in memory of the next instruction, instruction modification apparatus operable in a single machine cycle comprising a plurality of internal storage registers, means for storing numbers in said internal storage registers, means for storing an instruction having an operand portion and an address portion which is normally used to specify the address in memory of data to be manipulated in accordance with said operand portion, means responsive to the operand portion of one instruction for selecting said program counter and one of said internal storage registers and means responsive to the operand portion of said one instruction for adding the numbers stored in said program counter and said selected register to the address portion of said one instruction in an address modification operation during one cycle of said machine for providing a flexible relative indexing system in which the modified address portion is available to specify a memory location from which information may be obtained for use in the next machine cycle.

8. In a data processing machine operable in a sequence of instruction cycles, apparatus for causing said machine in response to a single instruction to modify the contents of an internal storage register and to modify the instruction during the modification of the internal storage register in a single machine cycle comprising a plurality of internal storage registers, means for storing numbers in said internal storage registers, means for storing an instruction having a first portion identifying an operation to be performed, a second portion representing data to be loaded into a storage register, a third portion identifying the internal storage register to be loaded, a fourth portion identifying a second internal storage register, and an address portion, means responsive to the first portion of said single instruction for modifying the contents of the register identified by the third portion of said single instruction with the contents of said second portion of said single instruction and means for simultaneously modifying said address portion of said single instruction with the contents of the storage register identified by said fourth portion of said single instruction, both said modifying operations being performed in a single machine cycle so that the modified address portion of said single instruction is available to specify a memory address from which information may be obtained for use in the next machine cycle.

9. In a data processing machine operable in a sequence of instruction cycles, apparatus for enabling in response to a single instruction the modification of the contents of an internal storage register and the simultaneous modification of the instruction in a single machine cycle comprising a plurality of internal storage registers, means for storing numbers in said internal storage registers, means for storing an instruction having a first portion identifying an operation to be performed, a second portion representing data to be loaded into a storage register, a portion identifying the register to be loaded, a fourth portion identifying a second internal storage register and an address portion, binary adder means responsive to said single instruction adapted to be connected to said internal storage registers for modifying the contents of the register identified by said third portion of said single instruction, means to apply the contents of said second portion of said single instruction to said binary adder means for modifying the contents of the register connected to said adder means and means for simultaneously modifying the address portion of said single instruction with the contents of the storage register identified by said fourth portion of said single instruction, both said operations being performed in a single machine cycle so that the modified address portion of the said single instruction is available to specify a memory address from which information may be obtained for use in the next machine cycle.

10. In a data processing machine operable in a sequence of instruction cycles, apparatus for enabling in response to a single instruction the modification of the contents of an internal storage register and the simultaneous modification of the instruction in a single machine cycle comprising a plurality of internal storage registers, means for storing numbers in said internal storage registers, means for storing an instruction having a first portion identifying an operation to be performed, a second portion representing data to be loaded into a storage register, a third portion identifying the register to be loaded, a fourth portion identifying a second internal storage register and an address portion, first binary adder means adapted to be connected to said internal storage registers for modifying the contents of the register identified by said third portion of said single instruction, means to apply the contents of said second portion of said single instruction to said binary adder means for modifying the contents of the register connected to said adder means and second binary adder means, operative simultaneously with said first binary adder means, arranged to receive the contents of the register identified by said fourth portion and the address portion of said single instruction for modifying the address portion, both said operations being performed in a single machine cycle so that the modified address portion of the single instruction is available to specify a memory address from which information may be obtained for use in the next machine cycle.

11. An arithmetic unit for performing an arithmetic operation capable of being completed in a single cycle of machine operation and for performing such arithmetic operation on three binary coded input numbers, said input numbers being represented by signals, comprising means for handling the signals representing two of said numbers in parallel fashion to produce a first half add result, second means for storing separately from said first half add result in appropriately displaced locations relative to said first half add result carries generated during said first half add operation, means for combining the signals representing said third number to said first half add result to produce a second half add result, means to store with the first half add carries in said second means in appropriately displaced locations relative to said second half add result carries generated by said second half add operation and means to full add the second half add result and the carries stored in said second means to produce a set of signals indicating the true binary result of the combination of the three input numbers.

12. The arithmetic unit as claimed in claim 11 wherein each of said numbers has a parity indication associated therewith and further including a parity checking apparatus including a bistable device, having a complement input, means to apply the parity indication associated with each of said numbers to said complement input so that the correct parity indication of the result of the two half add operations is provided by said bistable device upon the completion of said two half add operations, means to generate the parity of the carries stored in said second means, means to generate the parities of the carries and of the sum generated as a result of the full add operation and means to compare the sum of the parities of the carries in said second means, the full add carries and the indication of said bistable device with the parity of the full add sum in a parity checking operation.

13. A high speed arithmetic unit for use in a digital computation machine adapted to perform an addition operation on three binary coded numbers in a single cycle of machine operation comprising a first register having a plurality of bistable devices, half adder circuitry coupled to said first register, means to store one of said numbers in said first register, means to apply a second number to said first register in parallel fashion to produce a first half add result, second register means having a plurality of bistable devices, means to apply the carries generated as a result of said first half add operation to the properly displaced devices in said second register, means to apply the third number to said first register to produce a second half add result, means to apply the carries generated as a result of the second half add operation to the properly displaced devices in said second register for storage with the first half add carries and means to full add the second half add in said first register result, and the stored carries in said second register to produce a final result indicating the true binary value of the sum of said three numbers.

14. The arithmetic unit as claimed in claim 13 and further including third register means having a plurality of bistable devices, means to store said second number in said third register at the same time that it is being applied to said first register and means to apply said third number to said second register in a storage operation, wiping out values previously stored therein, selection means for controlling the application of said third number to said first and second registers and means dependent on the operation of said selection means to full add the contents of either said first or third registers to the contents of said second register.

15. The arithmetic unit as claimed in claim 13 wherein each of said numbers has a parity indication associated therewith and further including a parity checking apparatus including a parity checking bistable device, having a complement input, means to apply the parity indication associated with each of said numbers to said complement input so that the correct parity indication of the result of the two half add operations in said first register is provided by said bistable device upon the completion of said two half add operations, means to generate the parity of the carries stored in said second register, means to generate the parities of the carries and of the sum generated as a result of the full add operation and means to compare the sum of the parities of the carries in said second register, the full add carries and the indication of said bistable device with the parity of the full add sum in a parity checking operation.

16. High speed information manipulating apparatus adapted for use in a digital computer arranged to handle information in binary coded form comprising first and second registers each having an equal number of bistable devices arranged in corresponding orders of significance, said first register including apparatus arranged to perform half add operations and said second register including apparatus arranged to perform full add operations, means to apply a first binary coded number to the devices in said first register in parallel fashion for storage therein, means to apply a second binary coded number to said first register in parallel fashion so that a first half add result of the first and second numbers is stored therein with the carries generated as a result of said first half add operation being applied for storage to the devices in said second register, each said carry generated from a bistable device in said first register being applied to the corresponding device of next higher significance in said second register, means to apply a third number to the bistable devices in said first register in parallel fashion to produce a second half add result with the carries generated from said bistable devices being stored in said second register in the corresponding devices of next higher significance and means to apply the second half add result from said first register to the value stored in said second register in a full add operation to produce a final result indicative of the true binary value of the sum of the three numbers.

17. The information manipulating apparatus as claimed in claim 16 and further including a third register having a plurality of bistable devices corresponding in number to said first and second registers, means to store said second number in said third register, means responsive to control information for producing a dual line transfer of the third number to said second register after the first half add operation so that the carries stored in said second register are erased and means responsive to said control information for transferring the contents of said third register to said second register in a full add operation to produce a final result indicative of the sum of said second and third numbers.

18. The apparatus as claimed in claim 16 wherein each of said numbers has parity information associated therewith, and further including means to parity check said full add operation, comprising first means adapted to provide an indication of the parity of said second half add result, second means adapted to compare the partity of the carries stored in said second register with the parity of said final result, and third means adapted to compare the parity of the carries resulting from said full add operation with the indications provided by said first and second means in a parity check of the full add operation.

19. The apparatus as claimed in claim 18 wherein said first means includes a bistable device having a complementing input, and means to apply the carry information associated with each of the said numbers to said complement input as said numbers are applied to said first register such that said bistable device indicates the true parity of said second half add result.

20. In a data processing machine operative in a sequence of instruction cycles in accordance with a program of instructions, instruction modification apparatus comprising a plurality of internal storage registers, means for storing numbers in said internal storage registers, means for selecting individual ones of said internal storage registers, means for reading out the numbers stored in two of said registers and generating a first half add result and resulting carries from these numbers, carry storage means for storing said resulting carries in appropriately displaced storage locations relative to said first half add result, means for reading out a third number from said registers and generating a second half add result and resulting carries from said third number and said first half add result, said resulting carries being stored in appropriately displaced locations relative to said second half add result in said carry storage means, and adder means for adding the signals representing said second half add result and the carries stored in said carry storage means to produce a set of signals indicating the true binary sum of said three input numbers.

21. In a data processing machine operable in a sequence of instruction cycles in accordance with a program of instructions with each instruction cycle comprising an instruction time during which an instruction read out of memory is decoded and address modification performed, and an execution time during which the operation specified by the instruction is executed, means for modifying an instruction by adding thereto more than one value during the instruction time of a single instruction cycle comprising a plurality of internal storage registers, means for storing numbers in said internal storage registers, means for storing an instruction, said instruction including a first portion indicating the operation to be executed, a second portion controlling the use of a first internal storage register, a third portion controlling the use of a second internal storage register and a fourth portion indicating a memory address, and means responsive to said second and third portions for adding the numbers stored in said first and second registers to said fourth portion in an index operation during the instruction time of one instruction cycle of said machine for modifying said fourth portion so that a modified address portion is available to specify a memory location before the start of the execution time of said one instruction cycle, including: means for handling the signals representing two of said numbers in parallel fashion to produce a half add result, second means for storing in appropriately displaced locations relative to said half add result the carries generated during said half add operation, means for half adding the signals representing said third number to said half add result to produce a second half add result, said second means operating to store in appropriately displaced locations relative to said second half add result the carries generated by said second half add operation and means to full add the second half add result and the stored carries to produce a set of signals indicating the true binary result of the combination of the three input numbers applied to said adder means.

22. The apparatus as claimed in claim 21 wherein each of said numbers has a parity indication associated therewith and further including a parity checking apparatus including a bistable device, having a complement input, means to apply the parity indication associated with each of said numbers to said complement input so that the correct parity indication of the result of the two half add operations is provided by said bistable device upon the completion of said two half add operations, means to generate the parity of the carries stored in said second means, means to generate the parities of the carries and of the sum generated as a result of the full add operation and means to compare the sum of the parities of the carries in said second means, the full add carries and the indication of said bistable device with the parity of the full add sum in a parity checking operation.

23. In a data processing machine operable in a sequence of instruction cycles in accordance with a program of instructions with each instruction cycle comprising an instruction time during which an instruction read out of memory is decoded and address modification performed, and an execution time during which the operation specified by the instruction is executed, means for modifying an instruction by adding thereto more than one value during the instruction time of a single instruction cycle comprising a plurality of internal storage registers, means for storing numbers in said internal storage registers, means for storing an instruction, said instruction including a first portion indicating the operation to be executed, a second portion controlling the use of a first internal storage register, a third portion controlling the use of a second internal storage register and a fourth portion indicating a memory address, and means responsive to said second and third portions for adding the numbers stored in said first and second registers to said fourth portion in an index operation during the instruction time of one instruction cycle of said machine for modifying said fourth portion so that a modified address portion is available to specify a memory location before the start of the execution time of said one instruction cycle, including: first and second registers each having an equal number of bistable devices arranged in corresponding orders of significance, said first register including apparatus arranged to perform half add operations and said second register including apparatus arranged to perform full add operations, means to apply a first number to the devices in said first register in parallel fashion for storage therein, means to apply a second number to said first register in parallel fashion so that a first half add result of the first and second numbers is stored therein with the carries generated as a result of said first half add operation being applied for storage to the devices in said second register, each said carry generated from a bistable device in said first register being applied to the corresponding device of next higher significance in said second register, means to apply a third number to the bistable devices in said first register in parallel fashion to produce a second half add result with the carries generated from said bistable devices being stored in said second register in the corresponding devices of next higher significance and means to apply the second half add result from said first register to the value stored in said second register in a full add operation to produce a final result indicative of the true binary value of the sum of the three numbers applied to said adder means.

24. The apparatus as claimed in claim 23 and further including a third register having a plurality of bistable devices corresponding in number to said first and second registers, means to store said second number in said third register, means responsive to control information for producing a dual line transfer of the third number of said second register after the first half add operation so that the carries stored in said second register are erased and means responsive to said control information for transferring the contents of said third register to said second register in a full add operation to produce a final result indicative of the sum of said second and third numbers.

25. The apparatus as claimed in claim 23 wherein each of said numbers has parity information associated therewith, and further including means to parity check said full add operation, comprising first means adapted to provide an indication of the parity of said second half add result, second means adapted to compare the parity of the carries stored in said second register with the parity of said final result, and third means adapted to compare the parity of the carries resulting from said full add operation with the indications provided by said first and second means in a parity check of the full add operation.

26. The apparatus as claimed in claim 23 wherein said first means includes a bistable device having a complementing input, and means to apply the carry information associated with each of the said numbers to said complement input as said numbers are applied to said first register such that said bistable device indicates the true parity of said second half add result.

References Cited by the Examiner

UNITED STATES PATENTS

| 2,800,277 | 7/1957 | Williams et al. | 235—157 |
| 2,810,516 | 10/1957 | Tootill et al. | 235—157 |
| 2,819,839 | 1/1958 | Jacobs et al. | 235—175 |
| 2,954,168 | 9/1960 | Maddox | 235—175 |
| 3,036,770 | 5/1962 | Harrison et al. | 235—153 |

OTHER REFERENCES

Pages 180–182, April 1958, "Report No. 80 on the Design of a Very High-Speed Computer," University of Illinois, Digital Computer Laboratory, Second edition.

ROBERT C. BAILEY, *Primary Examiner.*

CORNELIUS D. ANGEL, WALTER W. BURNS, JR., MALCOLM A. MORRISON, *Examiners.*

P. J. HENON, D. TESCHNER, *Assistant Examiners.*